United States Patent
Dashevsky et al.

(10) Patent No.: US 9,880,310 B2
(45) Date of Patent: Jan. 30, 2018

(54) METHOD FOR DETECTING FLUID FRONTS USING A COMBINATION OF ELECTRIC AND GRAVITY MEASUREMENTS IN BOREHOLES

(71) Applicants: Yuliy A. Dashevsky, Novosibirsk (RU); Alexander I. Makarov, Novosibirsk (RU); Alexandr N. Vasilevskiy, Novosibirsk (RU); Gleb V. Dyatlov, Novosibirsk (RU)

(72) Inventors: Yuliy A. Dashevsky, Novosibirsk (RU); Alexander I. Makarov, Novosibirsk (RU); Alexandr N. Vasilevskiy, Novosibirsk (RU); Gleb V. Dyatlov, Novosibirsk (RU)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 356 days.

(21) Appl. No.: 14/596,965

(22) Filed: Jan. 14, 2015

(65) Prior Publication Data

US 2015/0204996 A1 Jul. 23, 2015

(30) Foreign Application Priority Data

Jan. 14, 2014 (WO) ................ PCT/RU2014/000012

(51) Int. Cl.
*G01V 3/20* (2006.01)
*G01V 7/04* (2006.01)
(Continued)

(52) U.S. Cl.
CPC ................ *G01V 3/20* (2013.01); *E21B 43/20* (2013.01); *E21B 47/10* (2013.01); *G01V 3/34* (2013.01);
(Continued)

(58) Field of Classification Search
None
See application file for complete search history.

(56) References Cited

U.S. PATENT DOCUMENTS 5,495,175 A 2/1996 Ramirez et al.
5,886,255 A 3/1999 Aronstam
(Continued)

FOREIGN PATENT DOCUMENTS

CA 2302995 C 11/2001
WO 2012166228 A1 12/2012

OTHER PUBLICATIONS

Notification of Transmittal of the International Search Report and the Written Opinion of the International Searching Authority, or the Declaration; PCT/RU2014/000012; dated Sep. 25, 2014, 9 pages.
(Continued)

*Primary Examiner* — Jermele M Hollington
(74) *Attorney, Agent, or Firm* — Cantor Colburn LLP

(57) ABSTRACT

A method for estimating a displacement of a fluid-to-hydrocarbon interface in a reservoir in the earth includes: disposing an electrode in an injector borehole that is configured to inject a fluid into the reservoir; energizing the electrode with a voltage source to apply a voltage to the reservoir; disposing an electric field sensor in the injector borehole; disposing a gravity sensor in at least one of the injector borehole and a producer borehole that is offset a distance L from the injector borehole; injecting fluid into the reservoir; measuring a magnitude of a time-varying electric field due to the injecting using the electric field sensor to provide electric field measurements; measuring a magnitude of a time-varying gravitational field due to the injecting using the gravity sensor to provide gravitational field mea-
(Continued)

surements; and estimating the displacement using the electric field measurements and the gravitational field measurements.

18 Claims, 14 Drawing Sheets

(51) Int. Cl.
*G01V 3/34* (2006.01)
*G01V 3/38* (2006.01)
*G01V 11/00* (2006.01)
*E21B 43/20* (2006.01)
*E21B 47/10* (2012.01)

(52) U.S. Cl.
CPC ............... *G01V 3/38* (2013.01); *G01V 7/04* (2013.01); *G01V 11/00* (2013.01)

(56) References Cited

U.S. PATENT DOCUMENTS

| | | | |
|---|---|---|---|
| 6,060,886 A | 5/2000 | Tabarovksy et al. | |
| 6,125,698 A | 10/2000 | Schweitzer et al. | |
| 6,212,952 B1 | 4/2001 | Schweitzer et al. | |
| 6,467,543 B1 | 10/2002 | Talwani et al. | |
| 6,612,171 B1 | 9/2003 | Stephenson et al. | |
| 6,886,632 B2 | 5/2005 | Raghuraman et al. | |
| 6,954,698 B2 | 10/2005 | Tryggvason | |
| 7,043,366 B2 | 5/2006 | McDermott | |
| 7,508,735 B2 * | 3/2009 | Grechka | G01V 1/42 367/38 |
| 7,555,390 B2 | 6/2009 | Ramakrishnan | |
| 7,805,248 B2 | 9/2010 | Thigpen et al. | |
| 7,805,250 B2 | 9/2010 | Colombo et al. | |
| 8,064,287 B2 | 11/2011 | Harris et al. | |
| 8,113,042 B2 | 2/2012 | Donadille et al. | |
| 8,363,509 B2 | 1/2013 | Colombo et al. | |
| 8,386,180 B2 | 2/2013 | Davies | |
| 8,532,928 B2 | 9/2013 | Tabanou et al. | |
| 9,031,821 B2 * | 5/2015 | Oury | E21B 43/00 703/10 |
| 2005/0264295 A1 * | 12/2005 | Strack | G01V 3/24 324/375 |
| 2009/0272531 A1 * | 11/2009 | Montaron | E21B 43/16 166/252.1 |
| 2010/0259268 A1 * | 10/2010 | Zhang | G01V 3/28 324/339 |
| 2010/0286967 A1 * | 11/2010 | Vasilevskiy | G01V 11/00 703/2 |
| 2011/0155389 A1 | 6/2011 | Burtz et al. | |
| 2011/0198078 A1 * | 8/2011 | Harrigan | E21B 49/008 166/254.2 |
| 2012/0224455 A1 * | 9/2012 | Dorovsky | G01V 11/00 367/35 |
| 2013/0110402 A1 | 5/2013 | Godager et al. | |
| 2015/0061684 A1 * | 3/2015 | Marsala | E21B 49/00 324/355 |
| 2015/0160364 A1 * | 6/2015 | Hibbs | E21B 47/102 324/355 |
| 2015/0345262 A1 * | 12/2015 | Kpetehoto | E21B 44/02 175/27 |
| 2016/0259085 A1 * | 9/2016 | Wilson | E21B 47/123 |

OTHER PUBLICATIONS

Wang, et al., "Experimental Measurements of Seismoelectric Signals in Borehole Models"; Geophysical Journal International; Dec. 2015; 10 pages.

* cited by examiner

METHOD FOR DETECTING FLUID FRONTS USING A COMBINATION OF ELECTRIC AND GRAVITY MEASUREMENTS IN BOREHOLES

CROSS-REFERENCE TO RELATED APPLICATION

This application claims the benefit of an earlier filing date from PCT Application Serial No. PCT/RU2014/000012 filed Jan. 14, 2014, the entire disclosure of which is incorporated herein by reference.

BACKGROUND

Reservoirs of hydrocarbons, such as oil and gas, are typically contained within pores of an earth formation. One technique to extract hydrocarbons in the pores includes injecting water into the pores to force the hydrocarbons out of the pores and into a borehole from which they may be pumped out to the surface of the earth.

In order to monitor the extent of extraction of hydrocarbons from a reservoir to make efficient use of resources, it is useful to track the water-to-hydrocarbon interface. This may be accomplished by knowing the porosity of the formation, however, the porosity is not always known. Hence, it would be appreciated in the oil and gas industries if methods could be developed to track the water-to-hydrocarbon interface without requiring knowledge of the formation porosity.

BRIEF SUMMARY

Disclosed is a method for estimating a displacement of a fluid-to-hydrocarbon interface in a reservoir in the earth. The method includes: disposing an electrode in an injector borehole, the injector borehole penetrating the reservoir and being configured to inject a fluid into the reservoir; energizing the electrode with a voltage source to apply a voltage to the reservoir; disposing an electric field sensor in the injector borehole; disposing a gravity sensor in at least one of the injector borehole and a producer borehole that is offset a distance L from the injector borehole; injecting fluid into the reservoir using the injector borehole; measuring a magnitude of a time-varying electric field due to the injecting using the electric field sensor to provide electric field measurements; measuring a magnitude of a time-varying gravitational field due to the injecting using the gravity sensor to provide gravitational field measurements; and estimating the displacement of the fluid-to-hydrocarbon interface due to the injecting using the electric field measurements and the gravitational field measurements.

Also disclosed is an apparatus for estimating a displacement of a fluid-to-hydrocarbon interface in a reservoir in the earth. The apparatus includes: an electrode configured to be disposed in an injector borehole, the injector borehole penetrating the reservoir and being configured to inject a fluid into the reservoir; a voltage source coupled to the electrode and configured to apply a voltage to the electrode in order to apply the voltage to the reservoir; an electric field sensor configured to be disposed in the injector borehole and to measure a magnitude of a time-varying electric field to provide electric field measurements, the time-varying electric field being due to injection of the fluid into the reservoir using the injector borehole; a gravity sensor configured to be disposed in at least one of the injector borehole and a producer borehole offset a distance L from the injector borehole and to measure a magnitude of a time-varying gravitational field to provide gravitational field measurements, the time-varying gravitational field being due the injection; and a processor configured to receive the electric field measurements and the gravitational field measurements and to estimate the displacement using the electric field measurements and the gravitational field measurements.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed are method and apparatus for estimating a displacement of a fluid-to-hydrocarbon (e.g., oil or gas) interface in pores of a reservoir in an earth formation due to injection of water or other appropriate fluid into the reservoir. The injection (may also be referred to as flooding) results in a change in a reservoir property that can be measured and related to the displacement. The method and apparatus involve performing measurements of magnitude of an electric field and/or gravitational acceleration in an injector borehole and/or in a producer borehole that penetrate the reservoir. The electric field that is measured results from applying a voltage to the reservoir. The measurement may be performed before, during, and/or after the injection or flooding. The electric field and/or gravitational acceleration magnitude measurements are processed to estimate the displacement without requiring knowledge of the porosity of the formation.

Figure 1A:
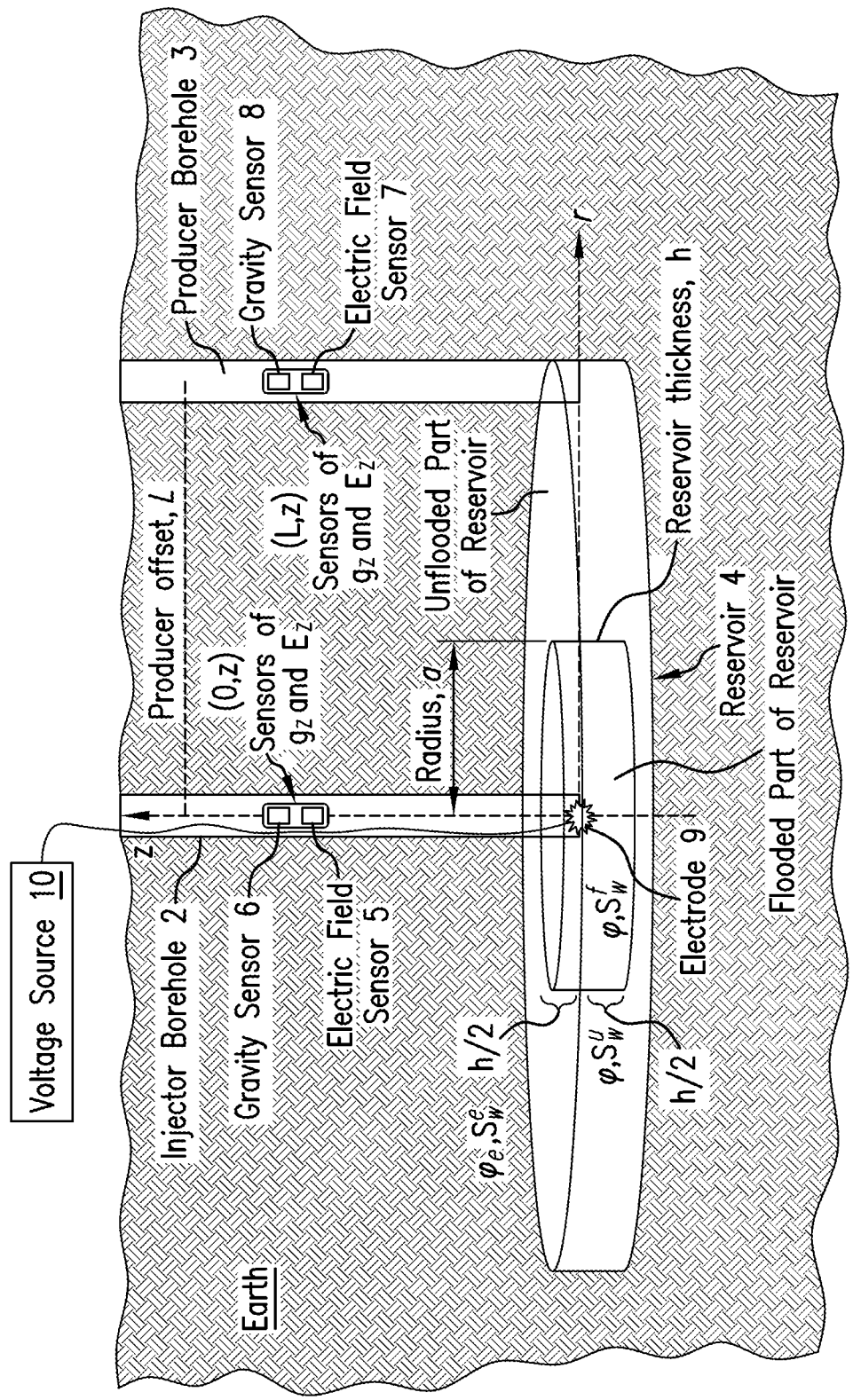
FIGS. 1A and 1B, collectively referred to as FIG. 1, present cross-sectional views of an earth formation penetrated by an injector borehole and a producer borehole.
Figure 1B:
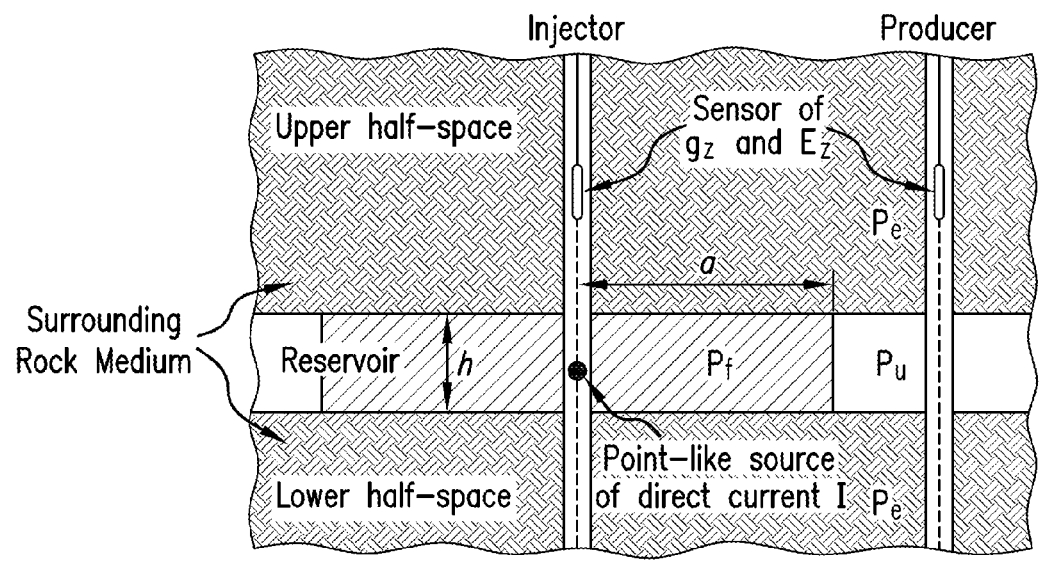

Referring to FIG. 1, an injector borehole 2 and a producer borehole 3 penetrating a reservoir 4 are illustrated. FIG. 1A presents a large scale view of the two boreholes while FIG. 1B presents a close up view. Fluid injector components (not shown) inject water or other appropriate fluid into the injector borehole 2 in order to force hydrocarbons into the producer borehole 3 where the hydrocarbons are extracted by hydrocarbon extraction components (not shown). Other appropriate fluids include fluids that have electric conductivity the same or greater than that of water and also have a density different from the density of a hydrocarbon and not smaller than ±0.02 g/cm$^3$. An electric field sensor 5 configured to sense a vertical component (z-direction) of an electric field magnitude and a gravity sensor 6 configured to sense a vertical component (z-direction) of a gravitational acceleration magnitude are disposed in the injector borehole 2. An electric field sensor 7 configured to sense a vertical component of an electric field magnitude and a gravity sensor 8 configured to sense a vertical component of a gravitational acceleration magnitude are disposed in the producer borehole 3. An electrode 9 is coupled to a voltage source 10 and is disposed in the injector borehole 2. The electrode 9 is configured to apply a zero-frequency voltage to and/or inject direct current (DC) into the reservoir 4 at a certain depth. Alternatively, a low-frequency voltage may be applied to inject a low-frequency current in to the reservoir 4. In one or more embodiments, the electrode 9 is placed on a longitudinal axis of the borehole 2 at a reference depth where z=0. In one or more embodiments, the reference depth is at a vertical center of the reservoir. In one or more embodiments, a voltage is applied to the electrode 9 with respect to a ground potential at the surface of the earth by a voltage source 10. The ground potential may be obtained by a ground plane or electrode contacting the ground at the surface of the earth. The electric fields resulting from the application of the voltage to the reservoir by the electrode are measured using one or more of the electric field sensors. Sensors and electrodes may be permanently installed in the boreholes or reservoir or they may be carried by a carrier for temporary or long term use. In non-limiting embodiments, each electric field sensor may include two electrodes placed in the borehole and spaced from each other at a distance $d_e$. A voltage sensing device is used to measure the difference in potentials DU between these electrodes. Once measurements are taken, then the electric field E can be calculated: E=DU/$d_e$. In non-limiting embodiments, gravity sensors known as Gravilog available from Scintrex of Ontario, Canada may be used.

Formulation of the Problem.

To increase oil/gas production, water or other appropriate fluid is injected into an oil/gas-bearing formation. During the injection, the water contacts and displaces the oil/gas in the porous formation, forming a water-oil/gas contact boundary. Because this displacement is accompanied by variations in the formation density, tracking the movement of the contact may be performed using time-lapse surface and downhole gravity measurements.

Inversion of downhole gravity measurements is required to estimate the displacement. It is generally known that the inversion of gravity data observed from a three-dimensional (3D) geological structure is one of the most challenging problems of exploration geophysics. To reduce the ambiguity of the inverse problem solution, a regularization of the inverse problem solution is needed.

In general, there are two approaches to regularization of the inverse problem solution:

1. To incorporate any a priori set of information regarding the object under investigation.
2. To measure fields of different physical nature and eliminate/reduce the impact of unknown parameters on the inversion results by inverting a fixed combination of the fields which shows weak dependence on the unknown parameters.

The untapped reserves are investigated using the second approach and the moving fluid front is located by using a combination of borehole measurements of electric and gravity fields.

Model Used for a Simulation.

A scenario of a water flood implies that the water is injected through the injector borehole 2, which may be referred to as the injector, and propagates as a thin cylinder as illustrated in FIG. 1. For discussion purposes, it is assumed that the boundary of the flooded area is a circle as illustrated in FIG. 1. The effect of the reservoir water flood on the vertical components of the gravitational acceleration and electric fields is calculated. Both injector borehole 2 and the producer borehole 3, which may be referred to as the producer, are instrumented with sensors to measure these fields. For discussion purposes, oil is presented as the hydrocarbon that is being produced. In FIG. 1, the smaller cylinder represents the flooded part of the reservoir while the larger cylinder represents the unflooded part of the reservoir. The displaced flood area extends from 0 to a in the horizontal (r) direction and from –h/2 to +h/2 in the vertical (z) direction. Both injector and producer boreholes are instrumented with sensors to measure vertical components of gravity $g_z$ in the injector borehole and the producer borehole and vertical components of electric field $E_z$ in the injector borehole and the producer borehole. $\varphi$ is the porosity of the reservoir, $\varphi_e$ is the porosity of the medium or rock enclosing the reservoir, $S_w^u$ is water saturation of the unflooded portion of the reservoir, $S_w^f$ is water saturation in the flooded part of the reservoir, and $S_w^e$ is water saturation of the rock enclosing the reservoir.

Physical Properties of a Reservoir.

Resistivity of the porous saturated formation ($\rho_{formation}$) can be estimated using the Archie equation:

$$\rho_{formation} = \rho_{brine} \varphi^{-m} S_w^{-n}, \quad (1)$$

where $\rho_{formation}$ is formation resistivity; $\rho_{brine}$ is formation brine resistivity; $\varphi$—is porosity; $S_w$ is water saturation; and n and m are the Archie exponents. The values of n and m depend on petrophysical characteristics of the rocks under investigation. The value of $\rho_{brine}$ can be calculated using the following equation:

$$\rho_{brine} = 0.0123 + \frac{3647.5}{[NaCl(ppm)]^{0.955}} \left(\frac{41.5}{T+21.5}\right), \quad (2)$$

where [NaCl] is the salt concentration in the injected fluid and T is the temperature (C.°). The reservoir pressure is maintained by peripheral water injection, which is the primary driving mechanism in oil production. The injected seawater reduces salinity and, hence, the densities contrast between the oil and the water sweeping the oil. In general, values of n and m for the study area are n=2, m=1.7 and these particular values were used for estimation of parameters of flooded ($\rho_f$) and unflooded ($\rho_u$) areas of reservoir and of enclosing rock ($\rho_e$).

Simulated density changes were derived from replacement of oil by water in the pore volume at a fixed saturation value. The density of water-oil saturated rock ($\delta_S$) is evaluated as $$\delta_S = (1-\varphi)\delta_s + \varphi(\delta_w S_w + \delta_o S_o), \quad (3)$$

where $\delta_s$, $\delta_w$, and $\delta_o$—are skeleton (i.e., formation matrix), water, and oil densities, respectively.

Table 1 contains physical, electrical and fluid properties of rocks used in the teachings of this disclosure. For oil saturated rocks (unflooded area), density ($\delta_w^u$), water saturation ($S_w^u$) and oil saturation ($S_o^u$) are assumed to have the following values:

$$\delta_w^u = \delta_w;\ S_w^u = S_w = 0.2;\ S_o^u = S_o = 0.8.$$

In this case, expression (3) takes the form:

$$\delta_u = \delta_S = (1-\varphi)\delta_s + \varphi(S_o^u \delta_o + S_w^u \delta_w^u).$$

In the flooded area $$\delta_w = \delta_w^f;\ S_w = S_w^f = 0.9;\ S_o = S_o^f = 0.1$$

and $$\delta_f = \delta_S = (1-\varphi)\delta_s + \varphi(S_o^f \delta_o + S_w^f \delta_w^f).$$

It should be noted that, in the gravity discussion, an anomalous density contrast is:

$$\Delta\delta = \delta_f - \delta_u = (S_w^f - S_w^u)(\delta_w^f - \delta_o)\varphi + S_w^u(\delta_w^f - \delta_w^u)\varphi \quad (4)$$

or $$\Delta\delta = 0.7\varphi(\delta_w^f - \delta_o) + 0.2\varphi(\delta_w^f - \delta_w^u). \quad (5)$$

Anomalous gravity is proportional to $\Delta\delta$:

$$\Delta g^{anom} = g_z(a) - g_z(0) \sim \varphi(S_w^f - S_w^u)(\delta_w^f - \delta_o) + \varphi S_w^u(\delta_w^f - \delta_w^u), \quad (5')$$

where $g_z(0)$, $g_z(a)$ are gravity fields measured in the injector or producer before/during the flooding, respectively. Thus, the amplitude of anomalous gravity depends on porosity and changes in water saturation due to the movement of the flood front. Anomalous electric conductivity also depends on porosity, and yet, unlike anomalous gravity, it is affected not by changes in water saturation, but by water saturation itself. The latter statement is true for those areas in the geological medium, where the Archie equation is true (1). As used herein, the term "anomalous" relates to a change in a value of a property from a normal value that exists before flooding to another value that results from flooding.

The teachings disclosed herein use mathematical modeling of electric and/or gravity fields in order to relate measurements of these fields to the displacement of the fluid-to-hydrocarbon interface. Electric fields were calculated using COMSOL Multiphysics® software package. The gravitational fields can be calculated with help of the gravity and magnetic modeling software GM-SYS 3D available from Geosoft Inc. of Toronto, Canada. A model as represented in FIG. 1 using water as the injected fluid was used in the modeling. The values of model parameters are contained in Table 1.

TABLE 1

Values of model parameters (n = 2, m = 1.7)

| Parameter | | Flooded area | | | Unflooded area (u) | | | Enclosing rock | |
|---|---|---|---|---|---|---|---|---|---|
| Porosity, $\varphi$ | | 0.2 | 0.25 | 0.3 | 0.2 | 0.25 | 0.3 | 0.02 | 0.025 |
| Water saturation, $S_w$ | | | 0.9 | | | 0.2 | | | 0.9 | |
| Temperature, [C. °] | | | 90 | | | 90 | | | 90 | |
| Pressure, [psi] | | | 3000 | | | 3000 | | | 3000 | |
| Resistivity, $\rho_{brine}$ [Ohm · m] | | | 0.131 | | | 0.564 | | | 0.564 | |
| Resistivity, $\rho^f, \rho^u, \rho^e$ [Ohm · m]* | | 2.5 | 1.7 | 1.25 | 217 | 149 | 109 | 539 | 367 |
| Oil density, [g/cm³] | Normal | | 0.805 | | | 0.805 | | | — | |
| | In situ | | 0.778 | | | 0.778 | | | — | |
| Water dens. [g/cm³] | Normal | | 1.0363 | | | 1.0058 | | | 1.0058 | |
| | In situ | | 1.019 | | | 0.988 | | | 0.988 | |
| Salt concentration [ppm] | | | 50000 | | | 10000 | | | 10000 | |

TABLE 1-continued

Values of model parameters (n = 2, m = 1.7)

| Parameter | Reservoir | | | | | | Enclosing rock | |
|---|---|---|---|---|---|---|---|---|
| | Flooded area | | | Unflooded area (u) | | | | |
| Anomalous density contrast [g/cm³] | 0.035 | 0.0438 | 0.0525 | 0 | 0 | 0 | 0 | 0 |

*resistivity,
$\rho^f$ corresponds to flooded area,
$\rho^u$—unflooded area,
$\rho^e$—enclosing rock Detailed Discussion of Calculations.

The calculations are based on several properties of electric and gravity fields. To illustrate these properties, consider the following simple problem. A point-like source of direct current I is placed in a horizontally layered medium with two plane boundaries and located in the reservoir as illustrated in FIG. 1B. By solving a corresponding boundary problem in the cylindrical system of coordinates (r, z) as illustrated in FIG. 1, it is possible to demonstrate that the equation for the electric field potential considered in the reservoir can be written out as follows:

$$u(r,z) = \frac{\rho_2 I}{4\pi} \int_0^\infty F(\lambda, k_{12}, k_{23}) J_0(\lambda r) d\lambda. \quad (6)$$

In (6), the following notations are introduced: $J_0(\lambda r)$ is the Bessel function; $F(\lambda, k_{12}, k_{23})$ is the function describing the influence of the medium, and $k_{12}, k_{23}$ are the so called contrast coefficients (coefficients whose values lie between plus and minus 1) depending on electric resistivities of the upper half-space ($\rho_1$), reservoir ($\rho_2$), lower half-space ($\rho_3$):

$$k_{12} = \frac{\rho_2 - \rho_1}{\rho_2 + \rho_1}, k_{23} = \frac{\rho_3 - \rho_2}{\rho_3 + \rho_2}.$$

As it follows from Table 1 (where $\rho^e = \rho_1 = \rho_3$; $\rho^f = \rho_2$), a high-contrast model of a geoelectrical cross-section is obtained where $\rho^e \gg \rho^f$. This means that $k_{12} \approx 1$; $k_{23} \approx 1$ and, thus, potential u(r,z) and its electric filed measured inside the reservoir are proportional to resistivity of the reservoir, $\rho_2$.

Therefore, the equation for the vertical component of the electric field $E_z$ inside the layer, under the condition that the Archie equation within the reservoir (9) may be expressed in the following form:

$$E_z = E_{z1} \rho_{brine} \varphi^{-m} S_w^{-n}, \quad (7)$$

where $E_{z1}$ is the model value of the electric field calculated for the three-layer model at $\rho_2 = 1$ Ohm·m. (Bold type E indicates vector having magnitude and direction.) Equation (7) is based on $E_z = du(r,z)/dz$ where u is electrical potential. Since $k_{12} \approx 1$ and $k_{23} \approx 1$, the electric field magnitude depends on $\rho_2$ only. The value of $\rho_2$ can be obtained using the Archie equation.

An example is presented—as Case#1: Estimates of the size of the flooded area based on the joint borehole measurements of the electric and gravity fields.

Consider now the model shown in FIG. 1 and apply the electric field property for formations with high-contrast resistivities formulated above to evaluation of the parameters of the porous formation. May the source (i.e., electrode) and receiver (i.e., sensor) of the electric field be placed in the injector and remain inside the formation to be flooded. Due to the high contrasts with the medium (shown in Table 1), the electric field measured before the flooding will depend on the medium parameters as follows:

$$E_{zu} = E_{z1} \rho_{brine}^u \varphi^{-m} (S_w^u)^{-n} \quad (8)$$

After the flooding, the expression for the field may be written out as follows:

$$E_{zf} = E_{z1} \rho_{brine}^f \varphi^{-m} (S_w^f)^{-n} \quad (9)$$

It should be noted that, even though equation (9) formally holds true at a→∞, the modeling results indicate that equation (9) may be practically used with acceptable accuracy at a≥h.

As it follows from (8) and (9), the field ratio $E_{zf}/E_{zu}$ is proportional to the ratio between water saturation and resistivity of the formation before flooding and in the process of fluid injection into the formation:

$$\frac{E_{zf}}{E_{zu}} = \frac{\rho_{brine}^f}{\rho_{brine}^u} \left(\frac{S_w^f}{S_w^u}\right)^{-n}. \quad (10)$$

Accordingly, the following estimates may hold true for water saturation ratio (d) and porosity ($\varphi$):

$$d = \left(\frac{E_{zf}}{E_{zu}} \cdot \frac{\rho_{brine}^u}{\rho_{brine}^f}\right)^{1/n}, \quad (11)$$

$$\frac{S_w^u}{S_w^f} = d, \quad (11')$$

$$\varphi = \left(\frac{E_{z1} \rho_{brine}^f}{E_{zf}}\right)^{1/m} (S_w^f)^{-n/m} \quad (12)$$

$$\varphi = \left(\frac{E_{z1} \rho_{brine}^u}{E_{zu}}\right)^{1/m} (S_w^u)^{-n/m}. \quad (12')$$

Continuing the joint analysis of the electric and gravity fields, consider the anomalous gravity measured in the borehole. For anomalous gravity caused by the moving water front, an equation similar to (7) may be written out:

$$\Delta g^{anom} = \Delta g_1^{anom} (\varphi(S_w^f - S_w^u)(\delta_w^f - \delta_o) + \varphi S_w^u (\delta_w^f - \delta_w^u)), \quad (13)$$

where $\Delta g_1^{anom}$ is the anomalous gravity effect computed for the model with unit anomalous density ($\Delta\delta=1$ g/cc). The term $\Delta g_1^{anom}$ is now discussed further. Suppose a body has an arbitrary shape embedded into an enclosing medium. Densities of the body and the medium are $\delta_{body}, \delta_{medium}$ respectively. The anomalous gravity $\Delta g^{anom}$ arising due to the body appearance is always in direct proportion to anomalous density $\Delta\delta$ (due to linearity of gravity problem): $\Delta g^{anom} =$ constant$*\Delta\delta$ and $\Delta\delta = \delta_{body} - \delta_{medium}$. Assuming that the anomalous density $\Delta\delta=1$ g/cc, then the anomalous gravity corresponding to $\Delta\delta=1$ g/cc is $\Delta g_1^{anom}$. If the shape of the body is given, then the function $\Delta g_1^{anom}$ can be calculated. Getting back to the problem, following the considerations given above (i.e., the linearity of the gravity problem), equation (13") for anomalous gravity caused by the moving water front may be written out as:

$$\Delta g^{anom} = \Delta g_1^{anom} \cdot \Delta\delta = \Delta g_1^{anom} \cdot (\varphi(S_w^f - S_w^u)(\delta_w^f - \delta_o) + \varphi S_w^u(\delta_w^f - \delta_w^u)), \quad (13'')$$

where $\Delta\delta = (\varphi(S_w^f - S_w^u)(\delta_w^f - \delta_o) + \varphi S_w^u(\delta_w^f - \delta_w^u))$ is the anomalous density.

Taking into account the relationship between d, $S_w^f$, and $S_w^u$ expressed in (11), the above equation (13) can be re-written as follows:

$$\Delta g^{anom} = \Delta g_1^{anom} \varphi S_w^f[(1-d)(\delta_w^f - \delta_o) + d(\delta_w^f - \delta_w^u)]. \quad (14)$$

or $$\Delta g^{anom} = \Delta g_1^{anom} \varphi S_w^u[(1-d)/d(\delta_w^f - \delta_o) + (\delta_w^f - \delta_w^u)]. \quad (14')$$

From (9), the following is obtained:

$$\varphi S_w^f = \left(\frac{E_{z1}\rho_{brine}}{E_{zf}}\right)^{1/m} (S_w^f)^{(m-n)/m}$$

or $$\varphi S_w^f = \left(\frac{E_{z1}\rho_{brine}}{E_{zf}}\right)^{1/n} (\varphi)^{(n-m)/n}.$$

Using (14), a similar expression for the product $\varphi S_w^f$ may be arrived at via the values of the gravity field. Thus, the functions $\varphi S_w^f$ may be expressed both in terms of the electric field and the gravity field. The next step will be to exclude the product $\varphi S_w^f$ and obtain the expressions linking the petrophysical parameters of the formation with the electric field and the gravity field (it is noted that parameters $\varphi$ and $S_w^f$ remain):

$$\left(\frac{\Delta g^{anom}}{\Delta g_1^{anom}} \cdot \frac{1}{[(1-d)(\delta_w^f - \delta_o) + d(\delta_w^f - \delta_w^u)]}\right) = \quad (15)$$

$$\left(\frac{E_{z1}\rho_{brine}}{E_{zf}}\right)^{1/m} \cdot (S_w^f)^{(m-n)/m}$$

$$\left(\frac{\Delta g^{anom}}{\Delta g_1^{anom}} \cdot \frac{1}{[(1-d)(\delta_w^f - \delta_o) + d(\delta_w^f - \delta_w^u)]}\right) = \quad (15')$$

$$\left(\frac{E_{z1}\rho_{brine}}{E_{zf}}\right)^{1/n} (\varphi)^{(n-m)/n}$$

or $$\Delta g_1^{anom}(M_g, a)(E_{z1}(M_e, a))^{1/m} = \quad (16)$$

$$\left(\frac{E_{zf}(M_e)}{\rho_{brine}}\right)^{1/m} \frac{\Delta g^{anom}(M_g) \cdot (S_w^f)^{(n-m)/m}}{[(1-d)(\delta_w^f - \delta_o) + d(\delta_w^f - \delta_w^u)]}$$

$$\Delta g_1^{anom}(M_g, a)(E_{z1}(M_e, a))^{1/n} = \quad (16')$$

$$\left(\frac{E_{zf}(M_e)}{\rho_{brine}}\right)^{1/n} \frac{\Delta g^{anom}(M_g) \cdot (\varphi)^{(m-n)/n}}{[(1-d)(\delta_w^f - \delta_o) + d(\delta_w^f - \delta_w^u)]}.$$

Each of these equations (16 and 16') may be considered as an implicit equation for the unknown parameter a, the radius of the flooded area, which relates to the displacement of the water-to-oil interface.

In the left-hand sides of equations (16)-(16'), there are products of functions describing the model values of the electric field and the gravity field. The values of these functions depend on the desired model parameter, i.e. a, the radius of the flooded area within the reservoir (FIG. 1). These theoretical electric and gravity fields are computed in the points $M_e$, $M_g$ of the medium, respectively, i.e., in the points, where the fields $E_{zf}$ and $\Delta g^{anom}$ may be measured. Generally, the points $M_e$, $M_g$ do not have to coincide. For example, the electric field may be measured in the injector, while the gravity field may be measured in the producer.

In the right-hand sides of equations, there are measured or known values. The parameter $d = S_w^u/S_w^f$ can be found via pre-measurements and a priori information regarding electric resistivity of fluid in the flooded and unflooded areas of the reservoir. Water saturation $S_w^f$ in (16) is unknown, but we may use its approximation. It should be noted that, in the case of m=n, $(S_w^f)^{(n-m)/m}$ becomes unity, while in this case (m=1.7, n=2), the power index of $S_w^f$ equals 0.176. Because the power index is much smaller than unity, a 20% error of setting $S_w^f$ leads to a 3% error of finding $(S_w^f)^{m-n/m}$, which is quite acceptable for practical purposes. Porosity $\varphi$ in (16') is unknown, but its approximation may be used. It should be noted that, in the case of m=n, $(\varphi)^{(m-n)/n}$ becomes unity, while in this case (m=1.7, n=2), the power index of ($\varphi$) equals −0.15. Because the power index is much smaller than unity, a 20% error of setting co leads to a 3% error of finding $(\varphi)^{(m-n)/n}$, which is quite acceptable for practical purposes.

Thus, the analysis performed leads to the following conclusion: joint borehole readings of the electric field and the gravity field allows for locating the water-oil contact during the water sweep flood. The water-oil contact is located with no need of formation porosity data or precise water saturation data for the flooded area. The radius of the flooded area is found via joint processing and inversion of gravitational and electric borehole data.

In conclusion of this section, it is noted note that the relationships and equations provided above for evaluating the parameters a, d, $\varphi$, $S_w$ hold true when resistivity of the formation described by the Archie equation is linearly related to the amplitude of the electric field measured in the reservoir.

Consider an example of finding the radius of the flooded area with the help of (16). Let the radius of the disk be unknown. To find it, perform the following sequence of actions:

1. Fix the positions of the points $z_0$, $z$ on the injector axis, which are where the source and receiver of the electric field are located, respectively (e.g., let $z_0=0$ and $z=5$ m). These points are assumed to be inside the reservoir.

Figure 2:
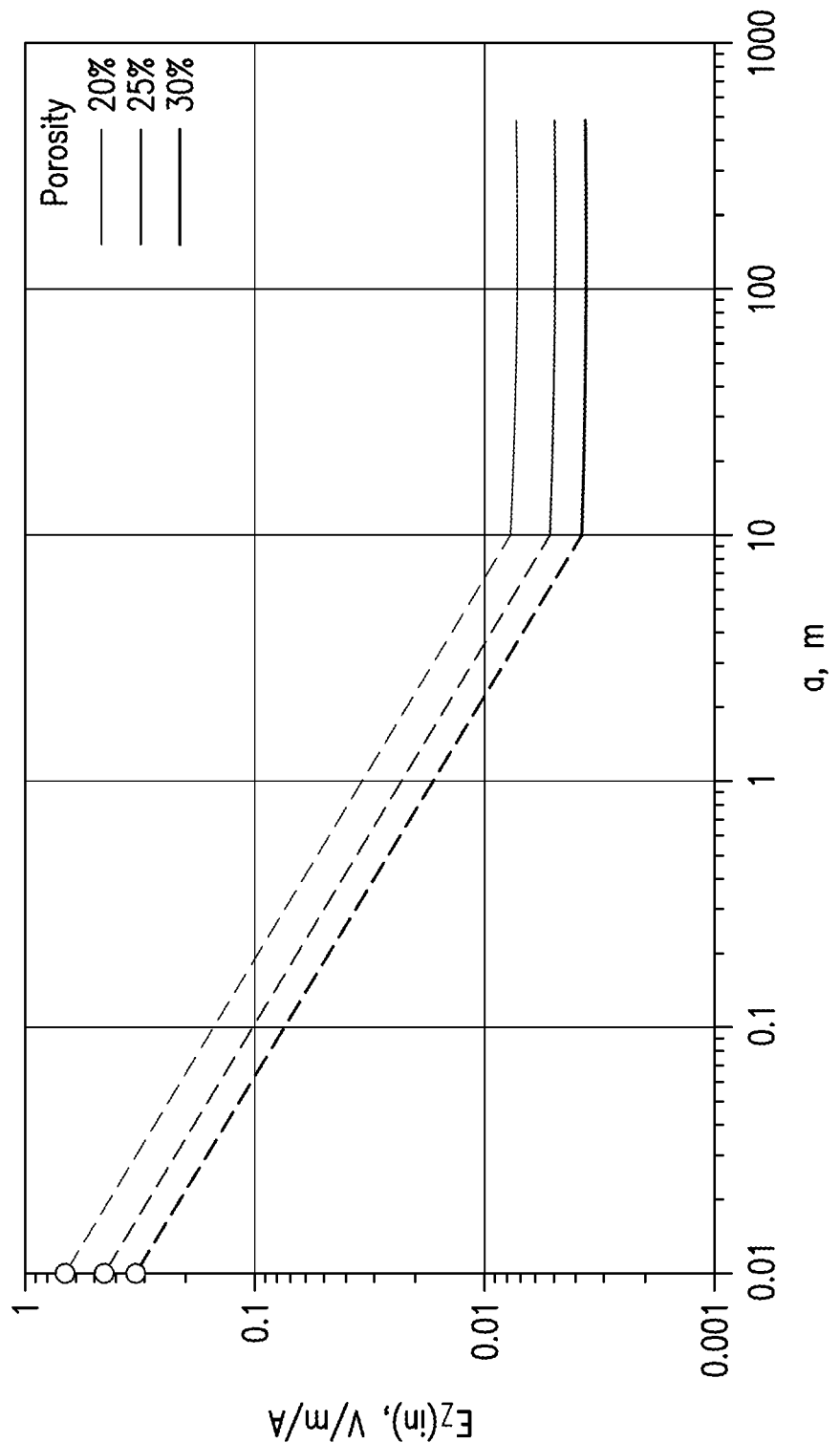
FIG. 2 is a graph of absolute value of vertical component of the anomalous electric field as a function of the radius "a" of the displaced flood area and reservoir porosity.

2. Perform two-dimensional (2D) math modeling using the data from Table 1 and verify that the relationship between formation resistivity and the electric field is linear. To this end, consider the data of FIG. 2, where the electric field values are listed for different radii a and different values of porosity (20, 25, 30%). FIG. 2 is a graph of the absolute value of the vertical component of the anomalous electric field $E_z^{(in)}$ as a function of the parameter a and reservoir porosity. The upper index (in) indicates that the electric field has been calculated in the injector borehole. As seen from these data, for a wide range of a ($0 \leq a \leq 480$ m), the ratio of electric field values equals that of porosities to the power of 1.7. This dependence appears to hold true with the accuracy of less than 0.5%. It should be noted that only porosity changes during modeling. The proportionality of the electric field and the product $\rho_{brine} S_w^{-n}$ can be verified by considering the ratio of the electric field values before flooding and in the process of flooding (at the current moment of time). The modeling results show that proportionality holds true with an error which does not exceed 3% for all porosity values under consideration.

3. Proceed to (16). In this relationship, the measured values $\Delta g^{anom}(M_g), E_{zf}(M_e)$ are considered known. Equations (16) and (16') may be considered as equations for evaluation of the unknown parameter a. In the left-hand side of the equations, there are functions describing the model values of the electric field and the gravity field. The values of these functions depend on the desired (unknown) model parameter a, the radius of the flooded volume. In the right-hand side of the equations, there are measured or known values. The problem is to determine a. Suppose that the value of this parameter is within a range a1, a2 (a1<a<a2). There is the only case when a is a solution: the left-hand side and right-hand side of the equations become identical or equal to each other. In other words, the solution to the problem under consideration is such a value of the radius a that equation (16) or (16') would be true for any points $M_g$, $M_e$. As it follows from the data of FIG. 2, the function $E_{z1}(M_e,a)$ for $a \geq 10$ m does not seem to depend on the radius at all, because it differs from the graphs shown by the multiplier $\rho_{brine}^f \varphi^{-m}(S_w^f)^{-n}$ (see (9)). This means that the ratio $$\frac{E_z(M_e)}{E_{z1}(M_e, a)}$$

does not appear to depend on the radius either. Equation (16) may be re-written as follows:

$$\Delta g_1^{anom}(M_g, a) = \left[\left(\frac{E_z(M_e)}{\rho_{brine} E_{z1}(M_e, a)}\right)^{1/m} \frac{(S_w^f)^{(n-m)/m}}{(1-d)(\delta_w^f - \delta_o) + d(\delta_w^f - \delta_w^u)}\right] \cdot \Delta g^{anom}(M_g),$$

or $$\Delta g_1^{anom}(M_g, a) = R(M_e, a) \cdot \Delta g^{anom}(M_g) \quad (17)$$

where $$R(M_e, a) = \left[\left(\frac{E_z(M_e)}{\rho_{brine} E_{z1}(M_e, a)}\right)^{1/m} \frac{(S_w^f)^{(n-m)/m}}{(1-d)(\delta_w^f - \delta_o) + d(\delta_w^f - \delta_w^u)}\right] \quad (18)$$

Figure 3:
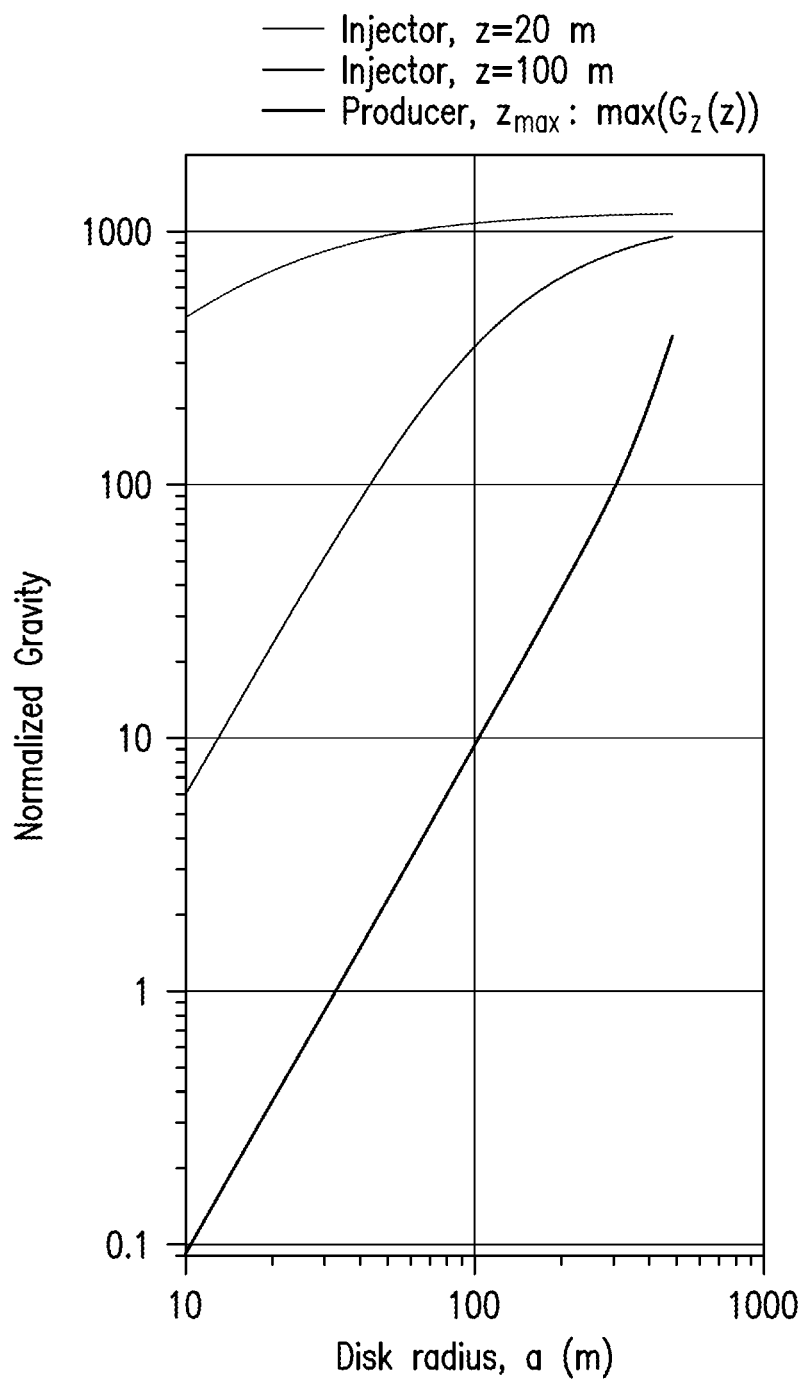
FIG. 3 is a graph of normalized values of anomalous gravity as a function of the parameter "a."

4. Find a by calculating the theoretical dependence of the normalized amplitude of the gravity field $\Delta g_1^{anom}(M_g, a)$ on the radius of the flooded volume a shown in FIG. 3 from the measured values of the gravity field. This calculation may be implemented by software for modeling a gravitational field. Next, calculate values of the function $R(M_e,a)$ using measurements of the electric field in borehole under the assumption, for example, that a>10 m. Since $E_z(M_e)/E_{z1}(M_e,a)$ does not depend on a (a>10 m), values of the $R(M_e,a)$ can be used for arbitrary values of the radius. The next step is to calculate measured normalized gravity field using the equation (17). If this field is given, then the disk radius can calculated based on theoretical curves presented in FIG. 3. FIG. 3 is a graph of normalized values of anomalous gravity as a function of the parameter a. In the injector, the function is computed in the points at distances of 20 and 100 m away from the center of the reservoir. In the producer borehole, the point of computation of the gravitational field is the point of the maximal value of the electric field due to the flooding.

As an example, the numerical values of the parameters in (16)-(16') will be shown. These computations were performed for the parameters of the model listed in Table 1.

$d=0.222$; $1-d=0.778$; $(\delta_w^f - \delta_o)=0.241$ g/cm³; $(\delta_w^f - \delta_w^u)=0.031$ g/cm³; $[(1-d)(\delta_w^f - \delta_o)+d(\delta_w^f - \delta_w^u)]=0.194$ g/cm³; $(S_w^f)^{m-n/m}=1.0188$
$\rho_{brine}^f=0.131$ Ohm·m; $\rho_{brine}^u=0.564$ Ohm·m Because $$\frac{E_z(M_e)}{E_{z1}(M_e, a)}$$

does not appear to depend on the radius, this relationship may be tabulated for the theoretical models under consideration (see Table 2, middle column). $R(M_e,a)$ may also be tabulated easily, taking into account the parameter values listed above (see Table 2, right-hand side column)

TABLE 2

| Porosity, % | $\frac{E_z(M_e)}{E_{z1}(M_e, a)}$ | $R(M_e, a)$ |
| --- | --- | --- |
| 20 | 2.495 | 28.63 |
| 25 | 1.707 | 22.91 |
| 30 | 1.252 | 19.09 |

Table 3 presents measurements and calculations used in the method of Case#1. A prior data includes $\delta_o$, $\delta_w^f$, $\delta_w^u$, $S_w^f$ (with accuracy ≤10%), $\rho_{brine}^u$, and $\rho_{brine}^f$.

TABLE 3

| What is measured or calculated | Where is it measured or calculated | When is it measured | What is obtained Equations used; | Step number |
| --- | --- | --- | --- | --- |
| Measured electric field $E_{zf}$ | Injector, inside the reservoir | During flooding, at times when a > 10 m | d - from equation (11) | 1 |
| Measured electric field $E_{zu}$ | Injector, inside the reservoir | Before flooding | $R(M_e, a)$ from equation (18) | |
| Measured gravity field $g_z(0)$ | Injector or producer, arbitrary selected point | Before flooding | $\Delta g_1^{anom}$ | 2 |
| Measured gravity field $g_z(a)$ | Injector or producer, arbitrary selected point | During flooding, at times when a >10 m | From equation (17) | |
| Calculation of normalized gravity field $\Delta g_1^{t, anom}$ as function of radius. An available 3D software is used | Points where gravity field is measured | — | Theoretical dependence of the normalized amplitude of the gravity field on the radius | 3 |
| — | — | — | Find radius a from comparison $\Delta g_1^{anom}$ with $\Delta g_1^{t, anom}$ | 4 |

Numerical Example.

The action sequence above is illustrated by the following numerical example. It is assumed that the gravity field in the point 1000 m away from the center of the layer is measured during the process of flooding, and this measured anomalous gravity turned out to be 14 μGal. Also suppose the electric field values measured in the layer before flooding and at the moment of measuring the gravity field yield the ratio $$\frac{E_{zf}}{E_{zu}},$$

which equals 92. Based on known values of electric resistivity and this ratio, (11) can be used to compute the parameter d (d=0,217) and then, $R(M_e,a)$, which will turn out to be 28. According to (18), the value obtained will be multiplied by the amplitude of measured anomalous gravity (14 μGal), and thus get 28·14 μGal=392 units of normalized gravity field. FIG. 3 shows that such amplitude of normalized field measured 100 m over the reservoir corresponds to the radius of the flooded area of 102 m.

Another example is presented—as Case#2: Estimates of the size of the flooded area based on the borehole measurements of the electric field.

Figure 4:
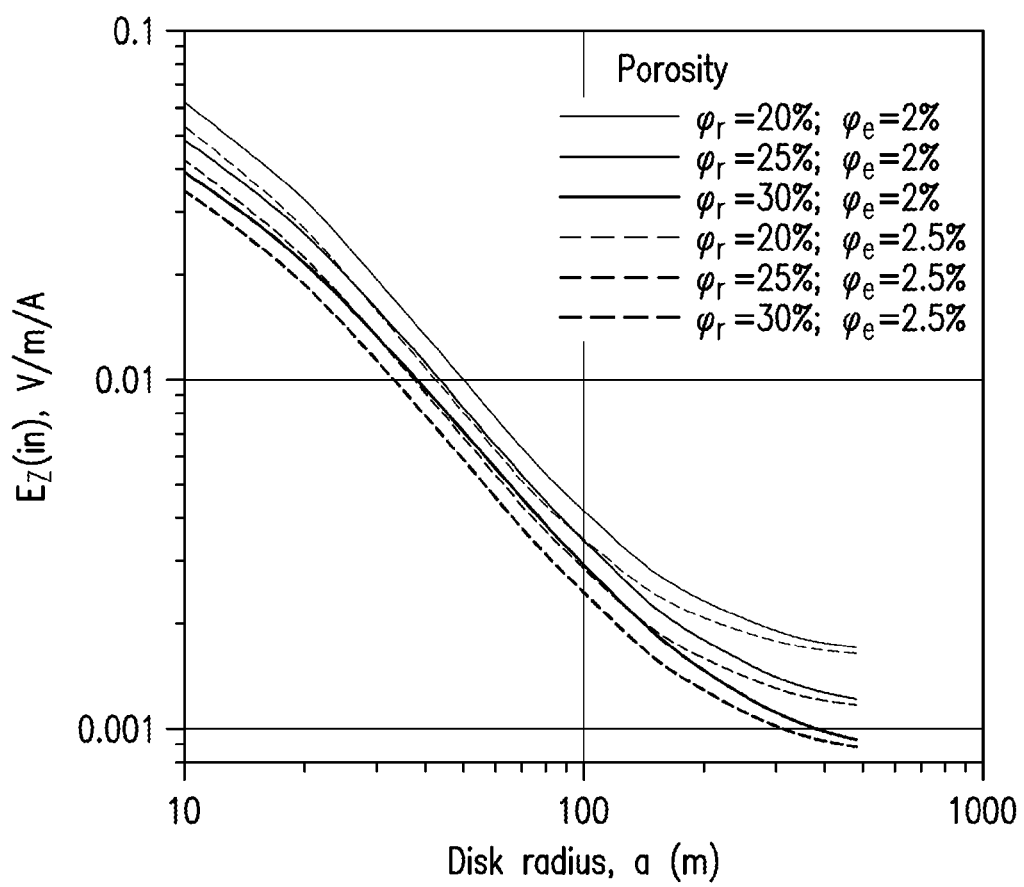
FIG. 4 is a graph of the absolute value of the vertical component of the electric field as a function of the parameter "a," reservoir porosity, and porosity of the enclosing medium.
Figure 5:
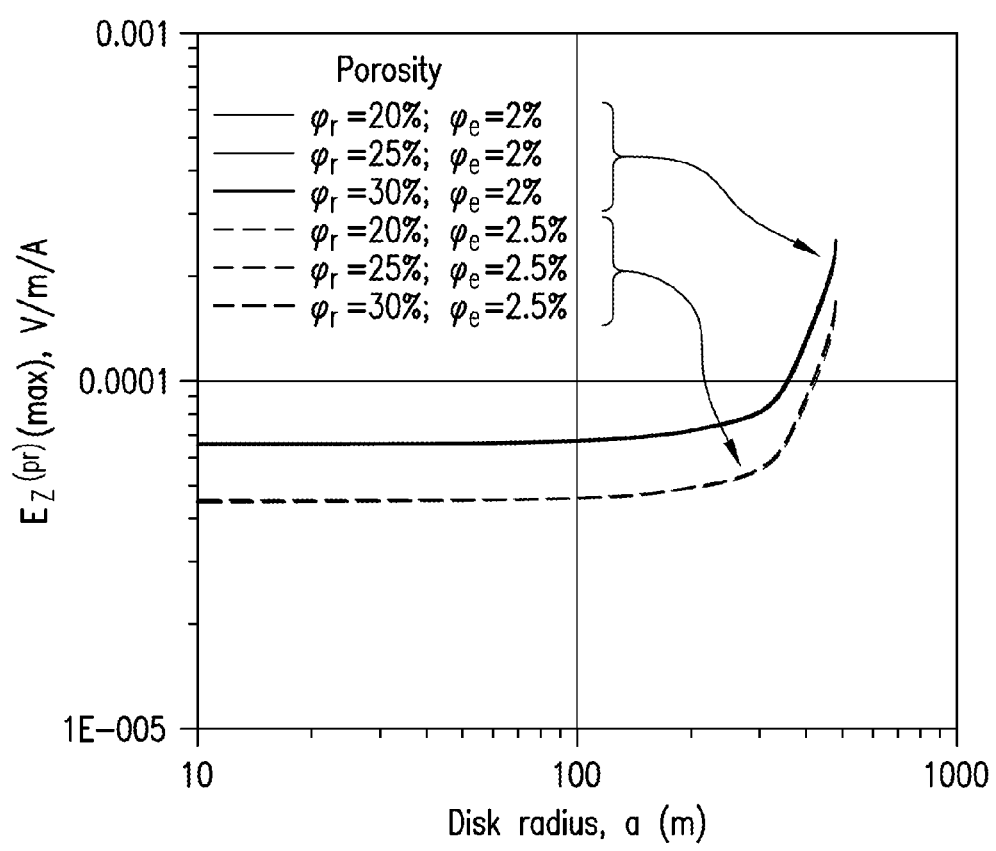
FIG. 5 is a graph of the peak absolute value of the vertical component of the electric field and a function of the parameter "a," reservoir porosity, and porosity of the enclosing medium.

Another method of finding the radius of the flooded area is now considered. To this end, it is disclosed to use the characteristics of the electric field measured outside the reservoir boundaries and then, to transform the measured signals. Table 4 presents measurements and calculations used in Case#2. It is necessary to transform the field because the fields themselves strongly depend on porosities of the enclosing medium and the reservoir. The values of the electric field measured in the injector outside the reservoir at the distance z=h from its middle at different values of a (10<a<480 m) are shown in FIG. 4. FIG. 4 is a graph of the absolute value of the vertical component of the electric field $E_z^{(in)}$ (at depth z=h) as a function of the parameter a, reservoir porosity $\varphi_r$ and porosity $\varphi_e$ of the enclosing medium or rock. The upper index (in) indicates that the electric field has been calculated in the injector borehole. For the same range of a, FIG. 5 shows the maximal electric field values (measured along the producer axis at the depth range of (h/2≤z≤L)). FIG. 5 is a graph of the peak absolute values of the vertical component of the electric field $E_z^{(pr)}$ as a function of the parameter a, reservoir porosity $\varphi_r$ and porosity $\varphi_e$ of the enclosing medium or rock (depth range h/2≤z≤L is considered). The values are calculated at the points of maximal magnitude of the electric field along the borehole. The upper index (pr) indicates that the electric field has been calculated in the producer borehole. As it follows from the data presented in FIG. 5, the vertical component of the electric field computed in the injector and producer has values exceeding 1 mV/m/A and 0.5 μV/m/A, respectively. The electric signals of such amplitude can be measured in the field. As it follows from FIGS. 4 and 5, this conclusion may hold true within a wide range of resistivity values of the flooded area and enclosing medium.

TABLE 4

| What is measured or calculated | Where is it measured or calculated | When is it measured | What is obtained Equations used; | Step number |
| --- | --- | --- | --- | --- |
| Measured electric field $E_z^{in}$ | Injector, outside the reservoir | During flooding, at times when 10 < a < 200 m | Transformation of field data using equation (19): | 1 |
| Measured electric field $E_z^{in}$ | Injector, outside the reservoir | Before flooding a = 0 m | $T^{in}(E_z^{in}, z) = \frac{E_z^{in}(z, a)}{E_z^{in}(z, 0)}$ | |

TABLE 4-continued

| What is measured or calculated | Where is it measured or calculated | When is it measured | What is obtained Equations used; | Step number |
|---|---|---|---|---|
| Measured electric field $E_z^{pr}$ | Producer, outside the reservoir at two point:<br>1). Point $z_{max}$ of maximal magnitude of electric field<br>2). At a significant distance (z ~ L) from the center of the reservoir.<br>~ relates to "about" | During flooding, at times when a > 100 m | Transformation from equation (20):<br><br>$T^{pr}(E_z^{pr}) = \dfrac{(E_z^{pr}(z=L, a) - E_z^{pr}(z_{max}, a))}{(E_z^{pr}(z=L, 0) - E_z^{pr}(z_{max}, 0))}$ | 1 |
| Measured electric field $E_z^{pr}$ | Producer, outside the reservoir at two point:<br>1). Point $z_{max}$ of maximal magnitude of electric field<br>2). At a significant distance (z ~ L) from the center of the reservoir. | Before flooding a = 0 m | | |
| Calculation of the transformations (19), (20) | Points where fields were measured | — | Theoretical dependences of the transformations on the radius | 2 |
| Calculation of the radius | — | — | Find radius a from FIGS. 6 and 7 | 3 |

The data presented show that, outside the reservoir, the relationship between the electric field and resistivity of the flooded area is not linear. Moreover, the signal strongly depends on the resistivity of the enclosing medium.

To remove the ambiguous relationship between the electric signal and the radius of the flooded area, transformation of the measured electric field is introduced. The type of this transformation depends on where the field is measured, in the producer or injector.

The field $E_z^{in}$ is measured in the injector: the analysis of the modeling results shows that transformation $T^{in}(E_z^{in}, z)$ enables one to find the radius of the flooded area based on the electric field readings obtained at the distance z away from the center of the reservoir z~h (i.e., approximately). This transformation is essentially normalization of the field $E_z^{in}$ measured during the process of flooding by the value of this signal measured before flooding:

$$T^{in}(E_z^{in}, z) = \frac{E_z^{in}(z, a)}{E_z^{in}(z, 0)} \quad (19)$$

Figure 6:
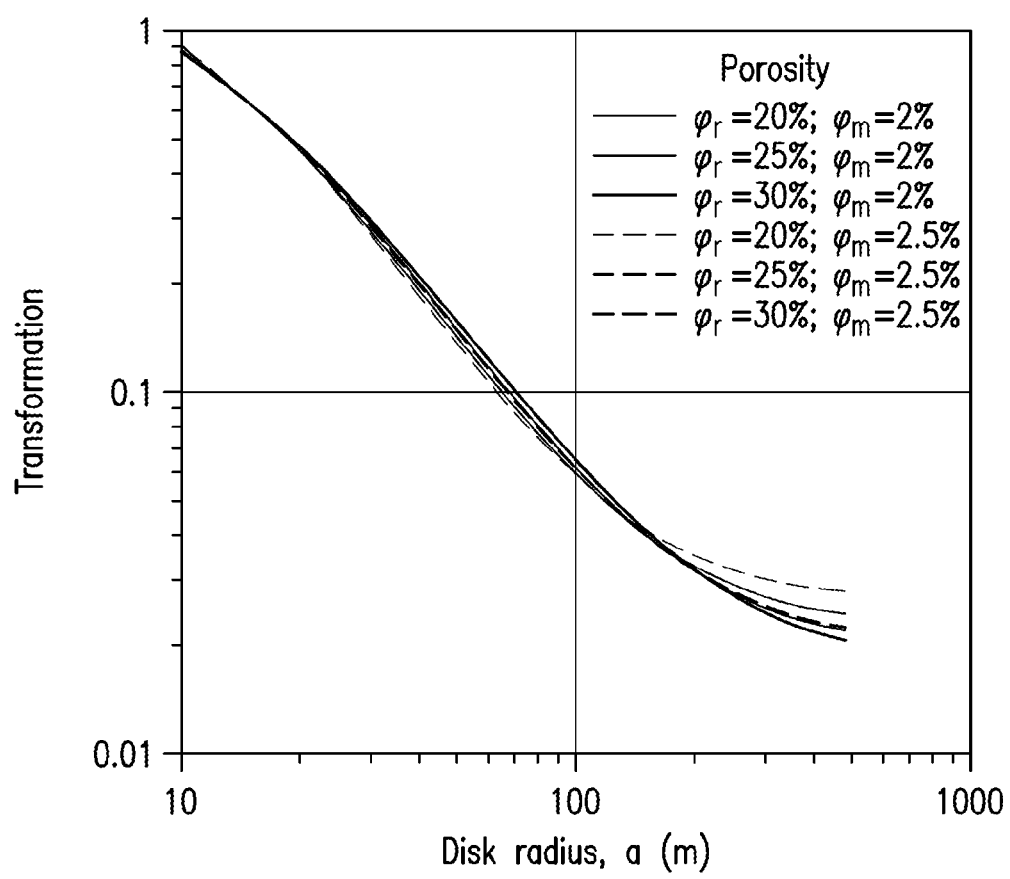
FIG. 6 is a graph of amplitudes of a transformation $T^{in}$ of the electric field in the injector borehole as a function of the parameter "a"

It can be seen in FIG. 6, the value of this transformation does not appear to depend on reservoir porosity or porosity of the medium if a is within 10<a<200 m. FIG. 6 is a graph of the transformation $T^{in}(E_z^{in}, z)$ as a function of the parameter a, reservoir porosity $\varphi_r$ and porosity of enclosing medium $\varphi_m$.

The field $E_z^{pr}$ is measured in the producer: transformation $T^{pr}(E_z^{pr})$ of the electric field measure in the producer also allows for finding the size of the flooded area for any resistivity of the medium or reservoir (see FIG. 7):

$$T^{pr}(E_z^{pr}) = \frac{(E_z^{pr}(z=L, a) - E_z^{pr}(z_{max}, a))}{(E_z^{pr}(z=L, 0) - E_z^{pr}(z_{max}, 0))} \quad (20)$$

Figure 7:
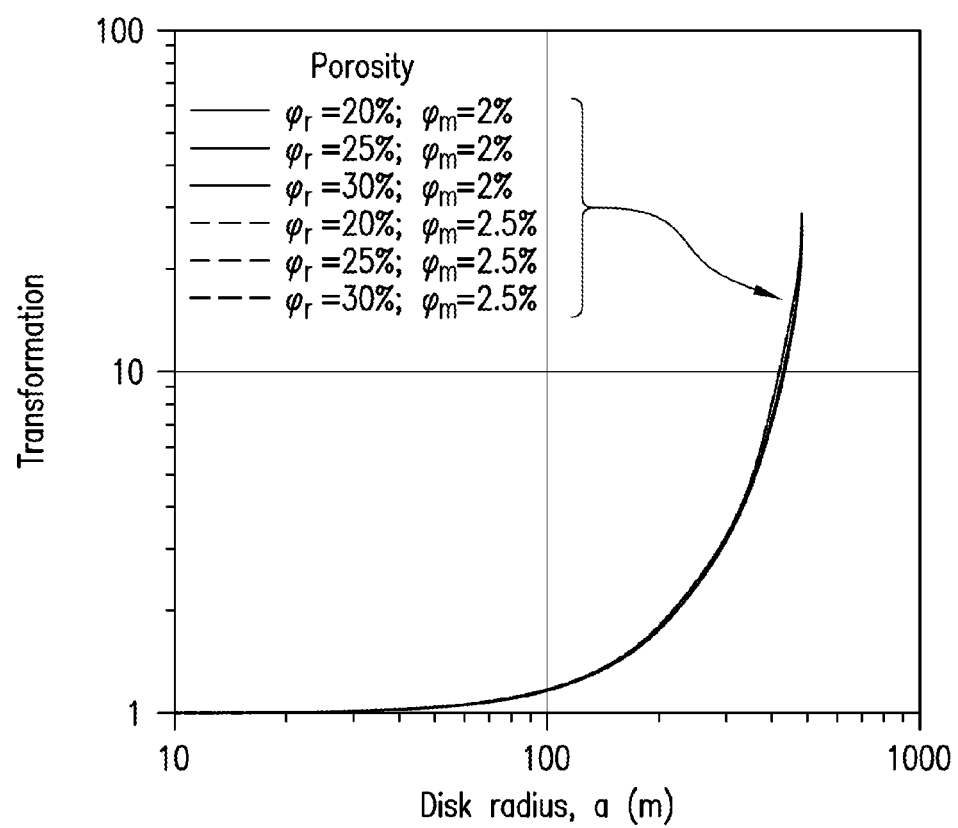
FIG. 7 is a graph of amplitudes of a transformation $T^{pr}$ of the electric field in the producer borehole as a function of the parameter "a"

To compute this transformation, measurements obtained in two points are needed: in $z_{max}$ of the maximal magnitude of electric field and at a significant distance (z~L) from the center of the reservoir. These measurements need to be performed twice: before and after flooding. FIG. 7 is a graph of amplitudes of the transformation $T^{pr}(E_z^{pr})$ as a function of the parameter a, reservoir porosity $\varphi_r$ and porosity of enclosing medium $\varphi_m$. The upper index (pr) indicates that the electric field has been calculated in the producer borehole.

Yet another example is presented—as Case#3: Estimates of the size of the flooded area based on the borehole measurements of the gravity field (only gravity measurements used, voltage application and electric field measurement not required).

Presented are two methods of evaluation of the water-oil/gas contact position if porosity is unknown and gravity measurements are available in the injector and producer wells.

First Method.

This method is based on gravity and gravity gradient measurements in the injector. It suffices to have just two measurements: on the top of bed ($\Delta g_z^{in}(z_{top})$, $z=z_{top}$) and above, at the point ($z=z_{top}+\Delta z$); $\Delta z$ is a distance required to calculate the field gradient. Table 5 presents measurements and calculations used in the first method of Case#3. A prior data includes reservoir thickness.

TABLE 5

| What is measured or calculated | Where is it measured or calculated | When is it measured | What is obtained Equations used; | Step number |
|---|---|---|---|---|
| Gravity measurement on the top of the reservoir: $g_z^{in}(z)$, $z = z_{top}$ | Injector, outside the reservoir | During flooding, at times when $220 < a < 400$ m | Transformation of the field data using equation (21): $T_\Delta = T_\Delta(\Delta g_z^{in}) = \frac{\Delta g_z^{in}(z_{top}) - \Delta g_z^{in}(z_{top} + \Delta z)}{\Delta z} \cdot \frac{1}{\Delta g_z^{in}(z_{top})}$ | 1 |
| Gravity measurement on the top of the reservoir: $g_z^{in}(z)$, $z = z_{top}$ | Injector, outside the reservoir | Before flooding $a = 0$ m | | |
| Gravity measurement $g_z^{in}(z)$ at the point $z = z_{top} + \Delta z$: $\Delta z$ is a distance required to calculate the field gradient | Injector, outside the reservoir | During flooding, at times when $220 < a < 400$ m | | |
| Gravity measurement $g_z^{in}(z)$ at the point $z = z_{top} + \Delta z$: $\Delta z$ is a distance required to calculate the field gradient | Injector, outside the reservoir | Before flooding $a = 0$ m | | |
| Calculation of the theoretical transformation (21) | Points where fields were measured | — | Theoretical dependences of the transformations on the radius | 2 |
| Calculation of the radius | — | — | Find radius a from FIGS. 8 | 3 |

The transformation $T_\Delta$ is defined as follows:

$$T_\Delta = T_\Delta(\Delta g_z^{in}) = \frac{\Delta g_z^{in}(z_{top}) - \Delta g_z^{in}(z_{top} + \Delta z)}{\Delta z} \cdot \frac{1}{\Delta g_z^{in}(z_{top})}. \quad (21)$$

In this formula, the gravity gradient is normalized by the field magnitude. This transformation does not depend on the porosity value because both gravity and the gravity gradient are proportional to porosity.

Figure 8:
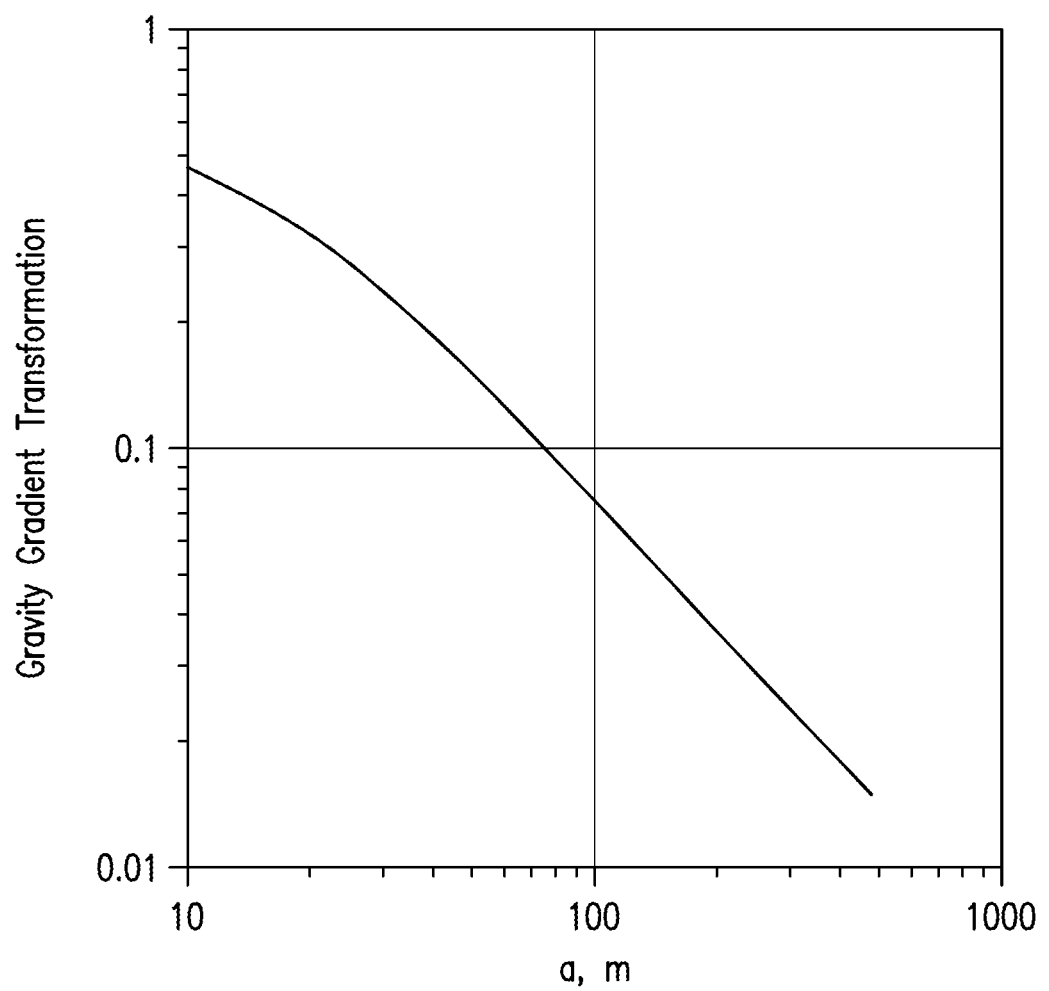
FIG. 8 is a graph of amplitudes of a transformation $T_A$ of a gravity gradient, as a function of the parameter "a"

FIG. 8 shows a log-log graph of the dependence of the function $T_\Delta$ on the disk radius. The slope of the tangent line to the graph equals the sensitivity function defined in (22):

$$\eta_a^{T_\Delta} = \frac{\partial \ln T_\Delta(\Delta g_z^{in})}{\partial \ln a}. \quad (22)$$

From FIG. 8 it is concluded that the sensitivity $\eta_a^{T_\Delta}$ equals 1 for $20 < a < 400$ m. FIG. 8 is a graph of the transformation $T_\Delta = T_\Delta(\Delta g_z^{in})$ as a function of the parameter a. In this graph, sensitivity $\eta_a^{T_\Delta}$ equals 1 for $20 < a < 400$ m.

Second Method.

This method is based on gravity measurements in both injector and producer wells. Two measurements are sufficient: on the top of bed ($z = z_{top}$) and/or above, at $z = z_{max}$, where the $z_{max}$ is the point of maximal variation of the anomalous gravity. Table 6 presents measurements and calculations used in the second method of Case#3. A priori data includes reservoir thickness.

TABLE 6

| What is measured or calculated | Where is it measured or calculated | When is it measured | What is obtained Equations used; | Step number |
|---|---|---|---|---|
| Gravity measurement on the top of the reservoir: $g_z^{in}(z)$, $z = z_{top}$ | Injector, outside the reservoir | During flooding, at times when $2220 < a < 500$ m | Transformation of the field data using equation (23): $T_{Gz} = T_{Gz}(\Delta g_z^{in}, \Delta g_z^{pr}) = \frac{\Delta g_z^{in}(z_{top})}{\Delta g_z^{pr}(z_{max})}$ | 1 |
| Gravity measurement on the top of the reservoir: $g_z^{in}(z)$, $z = z_{top}$ | Injector, outside the reservoir | Before flooding $a = 0$ m | | |
| Gravity measurement $g_z^{pr}(z)$ at the point $z = z_{max}$: | Producer, outside the reservoir Point $z_{max}$ of maximal magnitude of gravity field | During flooding, at times when $2220 < a < 500$ m | | |

TABLE 6-continued

Figure 9:
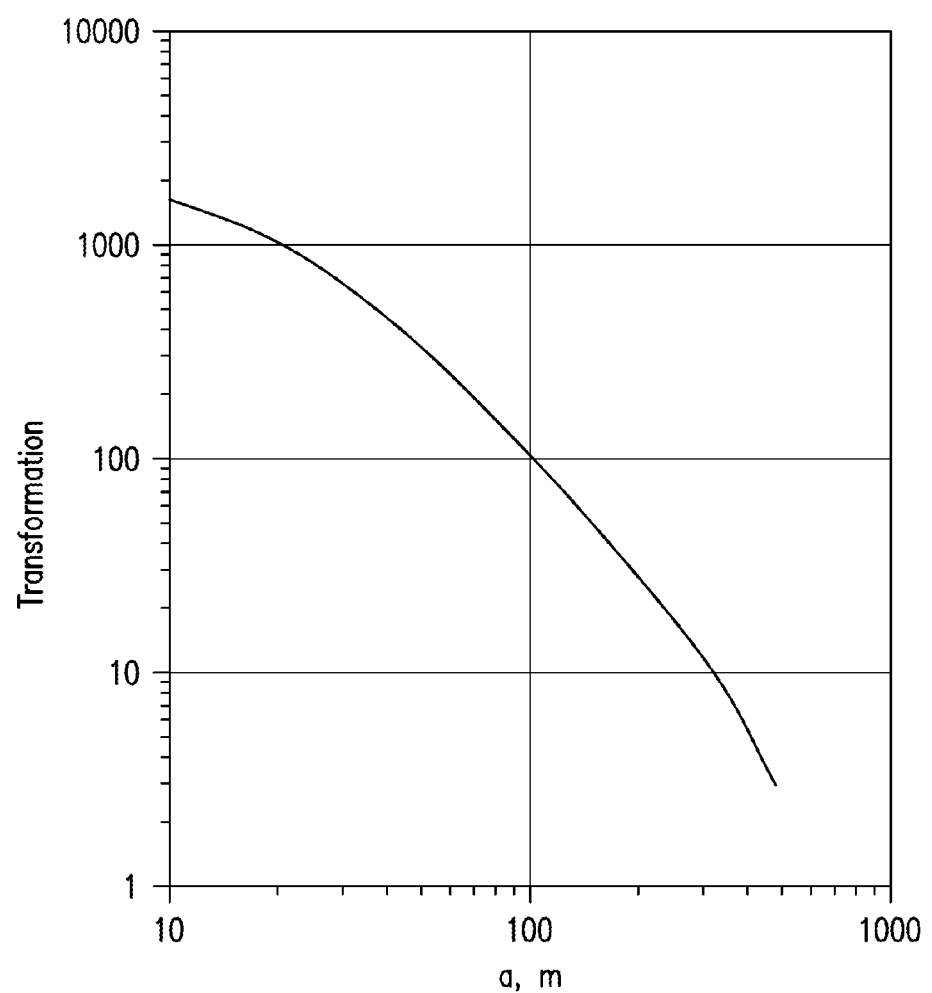
FIG. 9 is a graph of a transformation $T_{Gz}$, which uses the vertical gravity components at the bed tops in the injector and producer boreholes.

| What is measured or calculated | Where is it measured or calculated | When is it measured | What is obtained Equations used; | Step number |
|---|---|---|---|---|
| Gravity measurement $g_z^{pr}(z)$ at the point $z = z_{max}$: | Producer, outside the reservoir Point $z_{max}$ of maximal magnitude of gravity field | Before flooding a = 0 m | | |
| Calculation of the theoretical transformation (21) | Points where fields were measured | — | Theoretical dependences of the transformations on the radius | 2 |
| Calculation of the radius | — | — | Find radius a from FIGS. 9 | 3 |

The proposed transformation ($T_{Gz}$) uses the vertical gravity component at the bed top in the injector ($\Delta g_z^{in}(z_{top})$) and the vertical component of gravity above the bed top in the producer ($\Delta g_z in(z_{max})$. The point ($z_{max}$) where the anomalous gravity $\Delta g_z^{pr}$ arrives at its peak value is located above the bed top and $z_{max} \approx (L-a)/2$.

This transformation (see FIG. 9) is defined as follows:

$$T_{Gz} = T_{Gz}(\Delta g_z^{in}, \Delta g_z^{pr}) = \frac{\Delta g_z^{in}(z_{top})}{\Delta g_z^{pr}(z_{max})}. \quad (23)$$

Like transformation (21), this transformation does not depend on the homogeneous porosity value. FIG. 9 is a graph of values of the transformation $T_{Gz}(\Delta g_z^{in}, \Delta g_z^{pr})$ as a function of the parameter a. Sensitivity $\eta_a^{TGz}$ is about 2 for 20<a<400 m.

Figure 10:
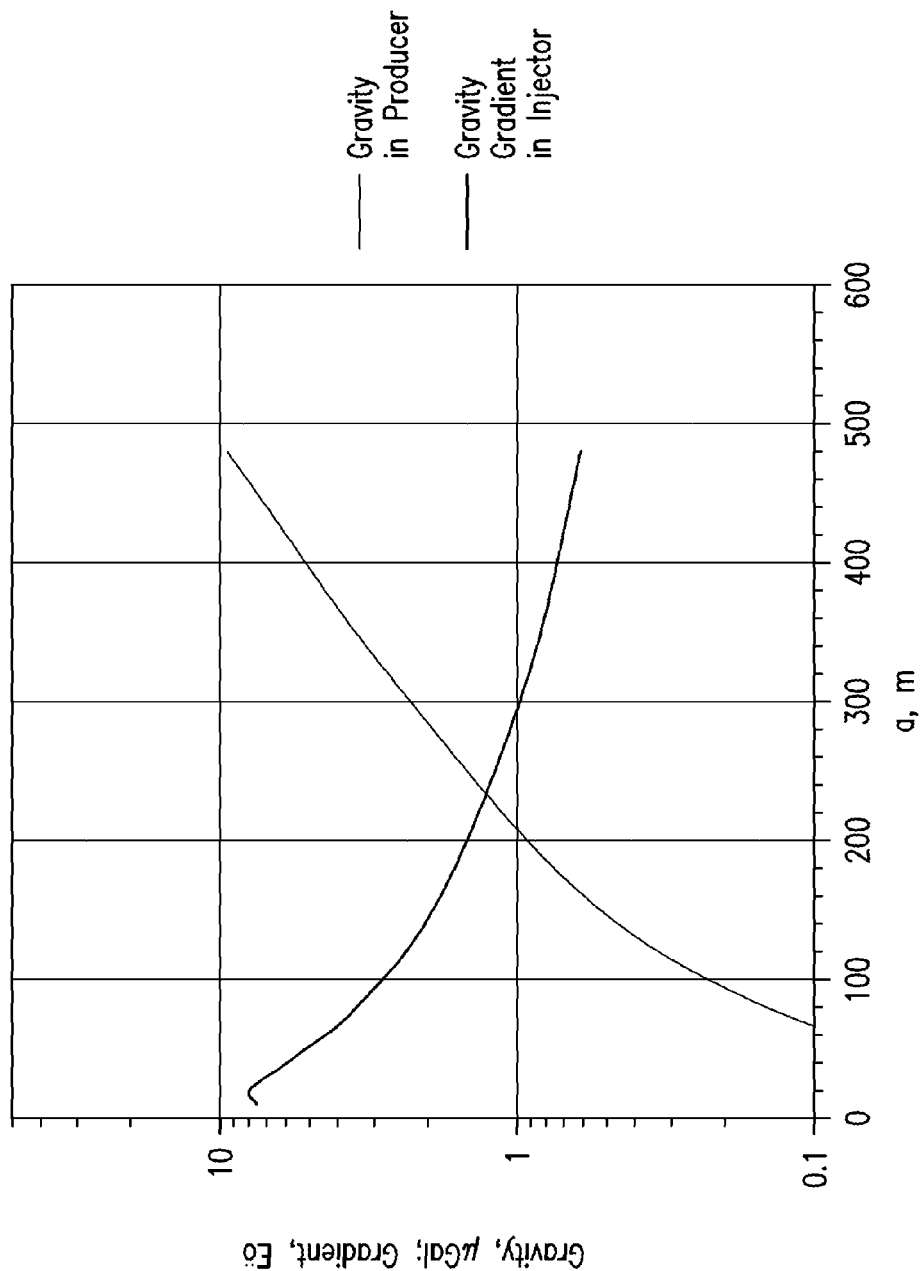
FIG. 10 is a graph of amplitudes of the gravity signal in the injector and producer boreholes.

It should be noted that the transformations $T_{Gz}$ and $T_A$ are complementary to each other when the parameter a (the front location) varies within a wide range. This is due to a small magnitude of the gravity signal in the producer when the parameter a is small, and to a small gravity gradient in the injector when the parameter a is large (about L). FIG. 10 illustrates this for the reservoir with parameters listed in Table 1 and the injector-to-producer distance being 500 m. FIG. 10 is a graph of amplitudes of the gravity signal in the producer borehole and gravity gradient in the injector borehole as a function of the parameter a.

FIG. 10 shows that the differential signal for station spacing of 10 m is greater than 1.4 µGal and can be measured if the accuracy is about 1 µGal and a does not exceed 200 m. Thus, the transformation $T_A$ works for 10<a<200 m. When a is greater than 200 m, the measurements in the producer are indispensable. FIG. 14 shows that, within 200-500 m, the gravity signal in the producer is greater than 1 µGal and could be measured. Therefore, in the latter case, the transformation $T_{Gz}$ is applicable.

Yet another example is presented—as Case#4: Estimates of porosity of the flooded area of the reservoir.

Inverting equations (14), (14') and (11') with respect to $\varphi S_w^u$, $\varphi$ and $S_w^f$, respectively, the following is arrived at:

$$\varphi S_w^u = \frac{\Delta g_1^{anom}(M_g, a)[(1-d)/d(\delta_w^f - \delta_o) + (\delta_w^f - \delta_w^u)]}{\Delta g^{anom}(M_g)} \quad (24)$$

-continued $$\varphi = \frac{\Delta g_1^{anom}(M_g, a)[(1-d)/d(\delta_w^f - \delta_o) + (\delta_w^f - \delta_w^u)]}{\Delta g^{anom}(M_g) \cdot S_w^u} \quad (25)$$

$$S_w^f = \frac{S_w^u}{d} \quad (26)$$

It is assumed that, using the necessary measurements of the electric and/or gravity fields in the boreholes, the methods described in Case#1, Case#2, Case#3 can be applied to find the parameter d and the radius of the flooded area a. Then, with the help of (25) and (26), water saturation of the flooded area and formation porosity can be estimated by the use of known a priori parameter $S_w^u$—water saturation of the unflooded portion the reservoir. If one of the parameters $\varphi$, $S_w^f$ is known a priori, then the other can be calculated via (12) and (12').

Figure 11:
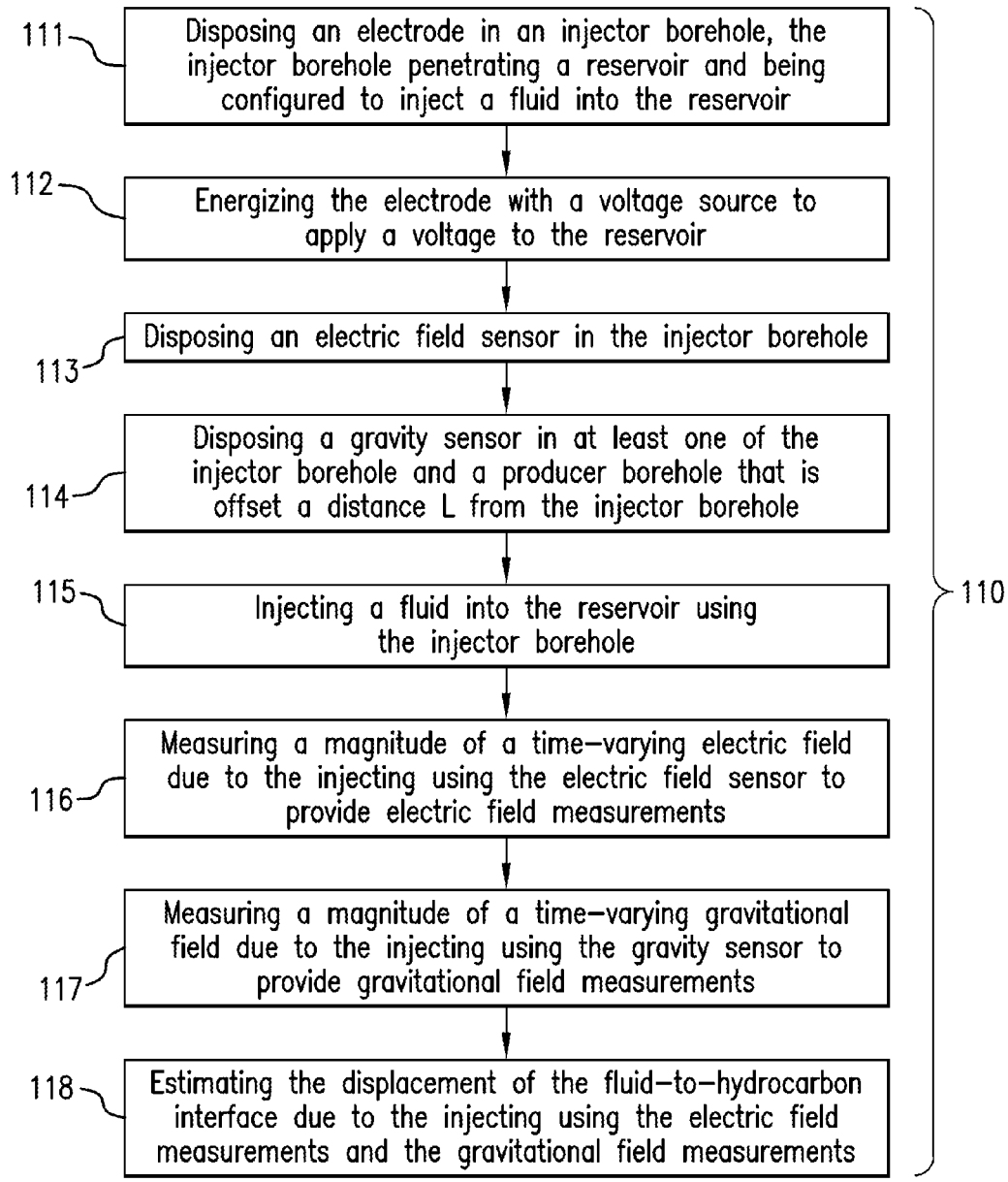
FIG. 11 is a flow chart for a method for estimating a displacement of a water-to-hydrocarbon interface in an earth formation using electric field and gravitational field measurements.

FIG. 11 is a flow chart for a method 110 for estimating a displacement of a fluid-to-hydrocarbon interface in a reservoir in the earth using electric field and gravitational field measurements. The method 110 corresponds to Case#1. Block 111 calls for disposing an electrode in an injector borehole. The injector borehole penetrates the reservoir and is configured to inject a fluid into the reservoir. Block 112 calls for energizing the electrode with a voltage source to apply a voltage to the reservoir. By applying the voltage, electric current may be injected into the reservoir. Block 113 calls for disposing an electric field sensor in the injector borehole. In one or more embodiments, the electric field sensor is inside of the reservoir such as inside a flooded portion of the reservoir for example. Block 114 calls for disposing a gravity sensor in at least one of the injector borehole and a producer borehole that is offset a distance L from the injector borehole. Block 115 calls for injecting the fluid into the reservoir using the injector borehole. Block 116 calls for measuring a magnitude of a time-varying electric field due to the injecting using the electric field sensor to provide electric field measurements. Block 117 calls for measuring a magnitude of a time-varying gravitational field due to the injecting using the gravity sensor to provide gravitational field measurements. Block 118 calls for estimating the displacement of the fluid-to-hydrocarbon interface due to the injecting using the electric field measurements and the gravitational field measurements. The method 110 may include solving equations (11), (17) and (18) in order to estimate the displacement. The method 110 may also include estimating the saturation or porosity of the reservoir such as by using equations (25) or (26), respectively, for example.

Figure 12:
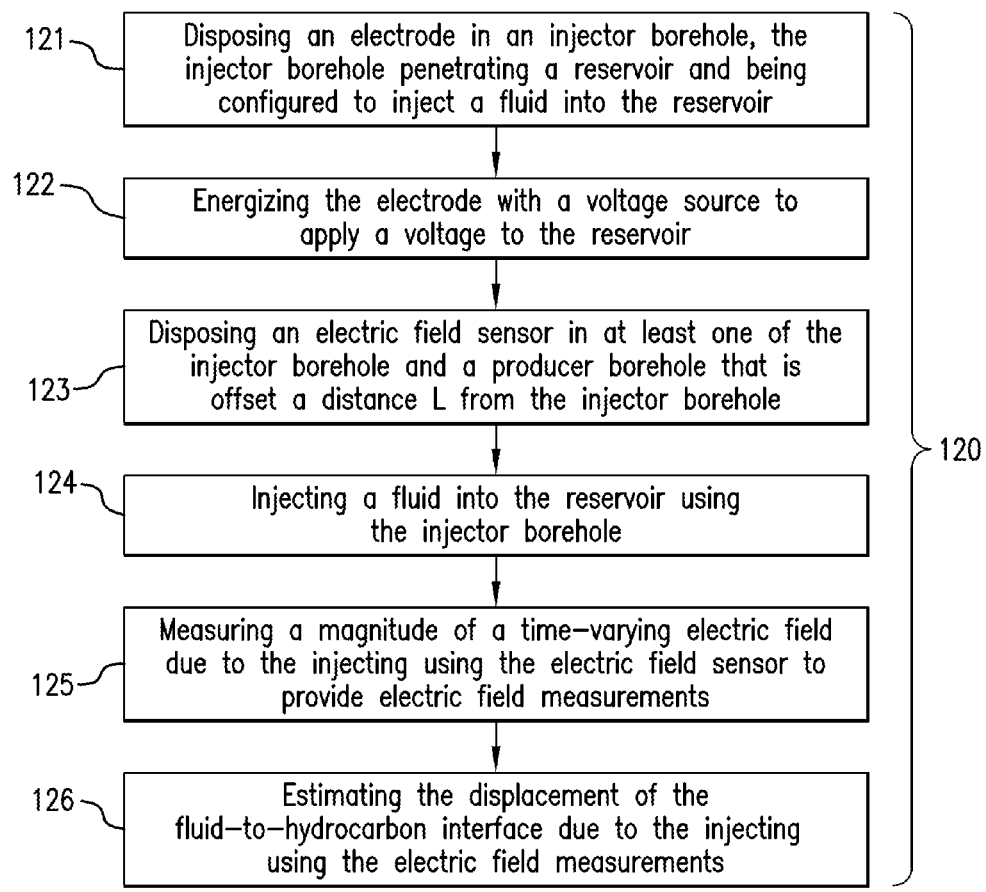
FIG. 12 is a flow chart for a method for estimating a displacement of a water-to-hydrocarbon interface in an earth formation using electric field measurements.

FIG. 12 is a flow chart for a method 120 for estimating a displacement of a fluid-to-hydrocarbon interface in a reservoir in the earth using electric field measurements. The method 120 corresponds to Case#2. Block 121 calls for disposing an electrode in an injector borehole. The injector borehole penetrates the reservoir and is configured to inject a fluid into the reservoir. Block 122 calls for energizing the electrode with a voltage source coupled to the electrode to apply a voltage to the reservoir. By applying the voltage, electric current may be injected into the reservoir. Block 123 calls for disposing an electric field sensor in at least one of the injector borehole and a producer borehole that is offset a distance L from the injector borehole. Block 124 calls for injecting the fluid into the reservoir using the injector borehole. Block 125 calls for measuring a magnitude of a time-varying electric field due to the injecting using the electric field sensor to provide electric field measurements. Block 126 calls for estimating the displacement of the fluid-to-hydrocarbon interface due to the injecting using the electric field measurements. In one or more embodiments, the electric field sensor is outside of the reservoir such as above the flooded portion of the reservoir for example. The electric field magnitude measurement may be performed before flooding, during flooding, and/or after flooding. The method 120 may include solving equation 19 or 20 in order to estimate the displacement of the fluid-to-hydrocarbon interface. When electric field measurements are performed in the producer borehole, measurements may be performed at two locations using a single electric field sensor that moves between the two locations or two separate electric field sensors where each is disposed at one of the two locations.

Figure 13:
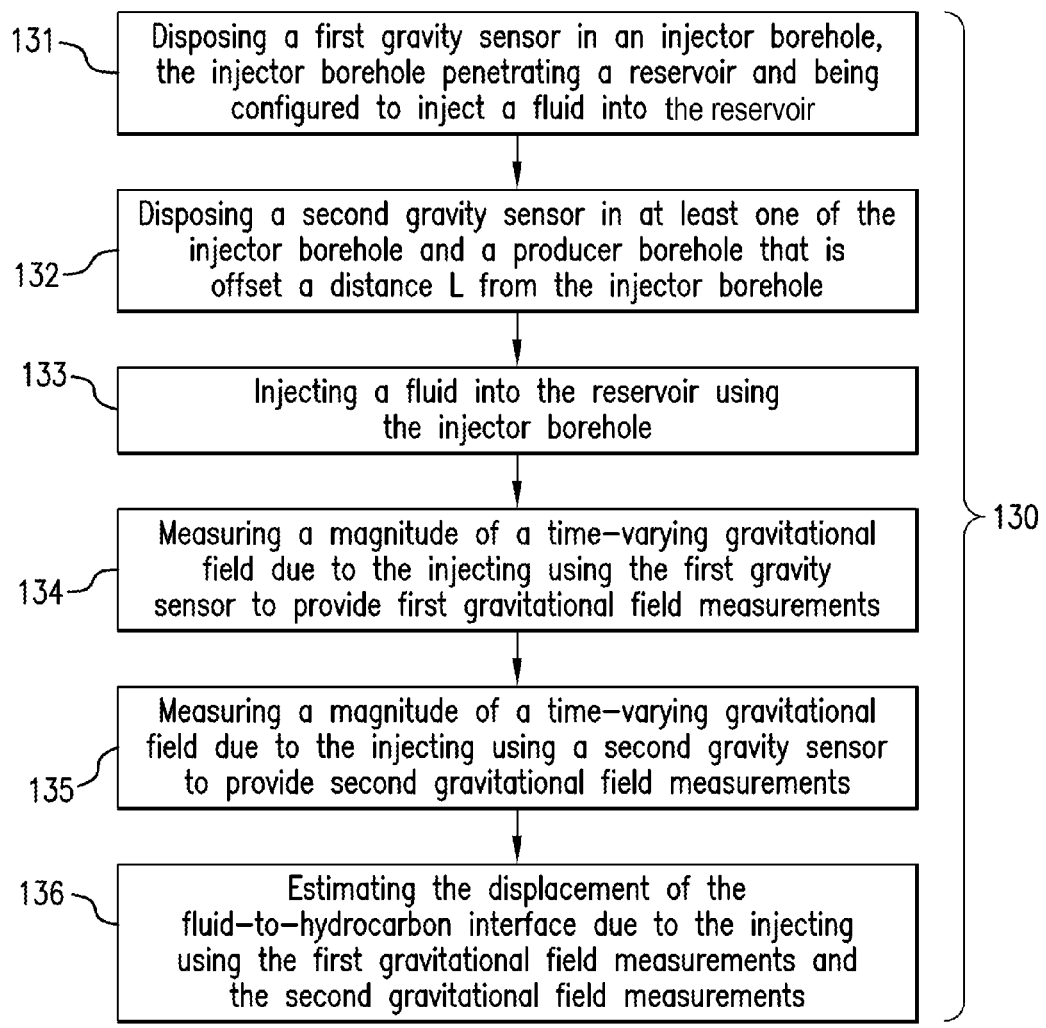
FIG. 13 is a flow chart for a method for estimating a displacement of a water-to-hydrocarbon interface in an earth formation using gravitational field measurements.

FIG. 13 is a flow chart for a method 130 for estimating a displacement of a fluid-to-hydrocarbon interface in a reservoir in the earth. The method 130 corresponds to Case#3. Block 131 calls for disposing a first gravity sensor in an injector borehole penetrating the reservoir. The injector borehole is configured to inject a fluid into the reservoir. The first gravity sensor is configured to sense a vertical component of a gravitational field. Block 132 calls for disposing a second gravity sensor in at least one of the injector borehole and a producer borehole that is offset a distance L from the injector borehole. Block 133 calls for flooding the reservoir with the fluid using the injector borehole. Block 134 calls for measuring a magnitude of a time-varying gravitational field due to the flooding using the first gravity sensor to provide first gravitational field measurements. Block 135 calls for measuring a magnitude of a time-varying gravitational field due to the flooding using the second gravity sensor to provide second gravitational field measurements. Block 136 calls for estimating the displacement of the fluid-to-hydrocarbon interface due to the flooding using the first gravitational field measurements and the second gravitational field measurements. When the second gravity sensor is disposed in the injector borehole, it is spaced a distance $\Delta z$ from the first gravity sensor. The method 130 may include solving equation (21) or (23) in order to estimate the displacement of the fluid-to-hydrocarbon interface. In one or more embodiments, the first and second gravity sensors are disposed outside of the reservoir. In one or more embodiments, measurements of the gravitational fields by each gravity sensor may begin before the injecting of the fluid commences.

In support of the teachings herein, various analysis components may be used, including a digital and/or an analog system. For example, the downhole electronics 11 or the computer processing system 12 may include digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure. Processed data such as a result of an implemented method may be transmitted as a signal via a processor output interface to a signal receiving device. The signal receiving device may be a display monitor or printer for presenting the result to a user. Alternatively or in addition, the signal receiving device may be memory or a storage medium. It can be appreciated that the signal receiving device upon receiving the signal will be transformed from a prior state (not containing the result) into a new state (containing the result). Further, an alert signal may be transmitted from the processor to a user interface if the result exceeds a threshold value.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are intended to distinguish different components and do not denote a particular order. The term "coupled" relates to one component being coupled to another component either directly or indirectly via an intermediate component. The term "configured" relates to one or more structural limitations of a device that are required for the device to perform the function or operation for which the device is configured.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for estimating a displacement of a fluid-to-hydrocarbon interface in a reservoir in the earth, the method comprising:

disposing an electrode in an injector borehole, the injector borehole penetrating the reservoir and being configured to inject a fluid into the reservoir;

energizing the electrode with a voltage source to apply a voltage to the reservoir;

disposing an electric field sensor in the injector borehole, the electric field sensor being configured to sense a magnitude of a vertical component of an electric field;

disposing a gravity sensor in at least one of the injector borehole and a producer borehole that is offset a distance L from the injector borehole;

injecting fluid into the reservoir using the injector borehole resulting in forcing hydrocarbons from the reservoir and into the producer borehole;

measuring a magnitude of a time-varying electric field due to the injecting using the electric field sensor to provide electric field measurements;

measuring a magnitude of a time-varying gravitational field due to the injecting using the gravity sensor to provide gravitational field measurements; and estimating the displacement of the fluid-to-hydrocarbon interface due to the injecting using the electric field measurements and the gravitational field measurements using a processor.

2. The method according to claim 1, wherein the fluid is water.

3. The method according to claim 1, wherein the fluid has an electric conductivity the same or greater than the electric conductivity of water and a density that is different from the density of a hydrocarbon and not less than ±0.02 g/cm³.

4. The method according to claim 1, wherein the applied voltage is at zero frequency.

5. The method according to claim 1, wherein the electric field sensor is disposed inside of a flooded portion the reservoir.

6. The method according to claim 1, wherein the electric field measurements and the gravitational field measurements are performed before flooding and during flooding.

7. The method according to claim 1, wherein estimating comprises solving:

$$\Delta g_1^{anom}(M_g, a)(E_{z1}(M_e, a))^{1/m} = \left(\frac{E_{zf}(M_e)}{\rho_{brine}}\right)^{1/m} \cdot \frac{\Delta g^{anom}(M_g) \cdot (S_w^f)^{(n-m)/m}}{\left[(1-d)(\delta_w^f - \delta_o) + d(\delta_w^f - \delta_w^u)\right]}$$

where:

$M_g$ is a location of the gravity sensor;

$M_e$ is a location of the electric field sensor;

a is distance from injector borehole to the fluid-to-hydrocarbon interface;

$S_w^f$ is water saturation of flooded reservoir;

$\rho_{brine}$ is brine resistivity;

d is the ratio of water saturation in unflooded reservoir to water saturation in flooded reservoir;

$\delta_w^f$ is the density of water in flooded reservoir;

$\delta_o$ is the density of hydrocarbon;

$\delta_w^u$ is the density of water in unflooded reservoir;

m is an exponent obtained from an electrical model of the reservoir and enclosing rock;

n is an exponent obtained from the electrical model of the reservoir and enclosing rock;

$\Delta g_1^{anom}$ is the anomalous gravity effect;

$\Delta g^{anom}$ is the measured anomalous gravitational field;

$E_{z1}$ is electric filed calculated from the electrical model of the reservoir and enclosing rock; and $E_{zf}$ is the measured electric field during injecting.

8. The method according to claim 1, wherein estimating comprises solving:

$$\Delta g_1^{anom}(M_g, a)(E_{z1}(M_e, a))^{1/n} = \left(\frac{E_{zf}(M_e)}{\rho_{brine}}\right)^{1/n} \cdot \frac{\Delta g^{anom}(M_g) \cdot (\varphi)^{(m-n)/n}}{[(1-d)(\delta_w^f - \delta_o) + d(\delta_w^f - \delta_w^u)]}$$

where:

$M_g$ is location of gravity sensor;

$M_e$ is location of electric field sensor;

a is distance from injector borehole to the fluid-to-hydrocarbon interface;

$\varphi$ is porosity of the reservoir;

$\rho_{brine}$ is brine resistivity;

d is the ratio of water saturation in unflooded reservoir to water saturation in flooded reservoir;

$\delta_w^f$ is the density of water in flooded reservoir;

$\delta_o$ is the density of hydrocarbon;

$\delta_w^u$ is the density of water in unflooded reservoir;

m is an exponent obtained from an electrical model of the reservoir and enclosing rock;

n is an exponent obtained from the electrical model of the reservoir and enclosing rock;

$\Delta g_1^{anom}$ model anomalous gravity effect with the anomalous density equal to 1 g/cm³;

$\Delta g^{anom}$ is the measured anomalous gravitational field;

$E_{z1}$ is electric field calculated from an electrical model of the reservoir and enclosing rock; and $E_{zf}$ is the measured electric field during injecting.

9. The method according to claim 1, further comprising estimating a porosity of the reservoir using the electric field measurements and the gravitational acceleration measurements.

10. The method according to claim 1, further comprising estimating a saturation of a flooded portion of the reservoir.

11. The method according to claim 10, further comprising solving:

$$S_w^f = \frac{S_w^u}{d}$$

where:

$S_w^f$ is water saturation of flooded portion of the reservoir;

d is the ratio of water saturation in unflooded portion of the reservoir to water saturation in flooded portion of the reservoir, calculated by use of equation:

$$d = \left(\frac{E_{zf}}{E_{zu}} \cdot \frac{\rho_{brine}^u}{\rho_{brine}^f}\right)^{1/n},$$

where:

$E_{zu}$ is the measured electric field before fluid injection;

$E_{zf}$ is the measured electric field during fluid injection;

$\rho_{brine}^u$ is brine resistivity of unflooded portion of the reservoir;

$\rho_{brine}^f$ is brine resistivity of flooded portion of the reservoir 10.

12. The method according to claim 1, further comprising estimating a porosity of a flooded portion of the reservoir.

13. The method according to claim 12, further comprising solving:

$$\varphi = \frac{\Delta g_1^{anom}(M_g, a)[(1-d)/d(\delta_w^f - \delta_o) + (\delta_w^f - \delta_w^u)]}{\Delta g^{anom}(M_g) \cdot S_w^u}$$

where:

$M_g$ is location of gravity sensor;

a is distance from injector borehole to the fluid-to-hydrocarbon interface;

$\varphi$ is porosity of the reservoir;

d is the ratio of water saturation in unflooded reservoir to water saturation in flooded reservoir;

$S_w^u$ is water saturation of unflooded reservoir;

$\delta_w^f$ is the density of water in flooded reservoir;

$\delta_o$ is the density of hydrocarbon;

$\delta_w^u$ is the density of water in unflooded reservoir;

$\Delta g_1^{anom}$ model anomalous gravity effect with assumption the anomalous density equals to 1 g/cm³; and $\Delta g^{anom}$ is the measured anomalous gravitational field.

14. The method according to claim 1, wherein the displacement is modeled as a radius a extending from the injector borehole.

15. An apparatus for estimating a displacement of a fluid-to-hydrocarbon interface in a reservoir in the earth, the apparatus comprising:

an electrode configured to be disposed in an injector borehole, the injector borehole penetrating the reservoir and being configured to inject a fluid into the reservoir resulting in forcing hydrocarbons from the reservoir and into a producer borehole offset a distance L from the injector borehole;

a voltage source coupled to the electrode and configured to apply a voltage to the electrode in order to apply the voltage to the reservoir;

an electric field sensor configured to be disposed in the injector borehole and to measure a magnitude of a vertical component of a time-varying electric field to provide electric field measurements, the time-varying electric field being due to injection of the fluid into the reservoir using the injector borehole;

a gravity sensor configured to be disposed in at least one of the injector borehole and the producer borehole and to measure a magnitude of a time-varying gravitational field to provide gravitational field measurements, the time-varying gravitational field being due the injection; and a processor configured to receive the electric field measurements and the gravitational field measurements and to estimate the displacement using the electric field measurements and the gravitational field measurements.

16. The apparatus according to claim 15, wherein the electrode is disposed in a flooded portion of the reservoir.

17. The apparatus according to claim 15, wherein the gravity sensor is disposed in a flooded portion of the reservoir.

18. The apparatus according to claim 15, wherein the gravity sensor is disposed outside of a flooded portion of the reservoir.

* * * * *